United States Patent
Karczewicz et al.

(10) Patent No.: US 6,856,701 B2
(45) Date of Patent: Feb. 15, 2005

(54) METHOD AND SYSTEM FOR CONTEXT-BASED ADAPTIVE BINARY ARITHMETIC CODING

(75) Inventors: Marta Karczewicz, Irving, TX (US); Ragip Kurceren, Irving, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/995,240

(22) Filed: Nov. 27, 2001

(65) Prior Publication Data

US 2003/0081850 A1 May 1, 2003

Related U.S. Application Data

(60) Provisional application No. 60/322,112, filed on Sep. 14, 2001.

(51) Int. Cl.[7] ............................. G06K 9/36; G06K 9/34
(52) U.S. Cl. ........................ 382/247; 382/173; 382/248
(58) Field of Search ................................. 382/173, 232, 382/233, 240, 247, 248, 250, 245, 251; 341/50, 59, 52, 67, 69, 79, 106, 107; 358/505

(56) References Cited

U.S. PATENT DOCUMENTS

| | | | | |
|---|---|---|---|---|
| 6,243,496 B1 | | 6/2001 | Wilkinson | 382/245 |
| 6,327,392 B1 | * | 12/2001 | Li | 382/248 |
| 6,339,658 B1 | * | 1/2002 | Moccagatta et al. | 382/240 |
| 6,351,563 B1 | | 2/2002 | Kim et al. | 382/232 |
| 6,545,618 B2 | * | 4/2003 | Yip | 341/107 |
| 6,567,081 B1 | * | 5/2003 | Li et al. | 345/419 |
| 6,577,251 B1 | * | 6/2003 | Yip | 341/50 |

OTHER PUBLICATIONS

I. H. Witten et al., "Arithmetic Coding for Data Compression," *Commun ACM*, vol. 30, pp. 520–540, Jun. 1987).

H.26L Test Model Long Term No. 8 (TML–8) draft0 ITU–T Telecommunication Standardization Section, Study Group 16, Video Coding Experts Group.

Gisle Bjontegaard, Recommended Simulation Conditions for H.26L (VCG–M75, ITU–T Video Coding Experts Group, Austin, TX USA, Apr. 2–4, 2001).

\* cited by examiner

*Primary Examiner*—Andrew W. Johns
*Assistant Examiner*—Amir Alavi
(74) *Attorney, Agent, or Firm*—Ware, Fressola, Va Der Sluys & Adolphson LLP

(57) ABSTRACT

A method and system for image coding, wherein an image is divided into a plurality of blocks for scanning. The pixels values in the scanned block are represented by a plurality of level-run value pairs, wherein the level value is indicative of a non-zero pixel value and the run value is indicative of the number of consecutive zero pixel values preceding the non-zero pixel value. A plurality of contexts indicative of the level-run value pairs are conveyed to a decoder for allowing the decoder to reconstruct the image based on the contexts. The assignment of the contexts is also based on the level value of a preceding level-run pair. Additionally, instead of an end-of-block symbol, the number of non-zero coefficients is provided to the decoder prior to conveying the contexts thereto.

40 Claims, 16 Drawing Sheets

FIG. 6c

| Level context | Initial state | | After encoding (4 x 4 block) | |
|---|---|---|---|---|
| | 0 | 1 | 0 | 1 |
| 1 | 1 | 1 | 8 | 1 |
| 2 | 1 | 1 | 6 | 3 |
| 3 | 1 | 1 | 3 | 6 |

| Run context | Initial state | | After encoding (4 x 4 block) | |
|---|---|---|---|---|
| | 0 | 1 | 0 | 1 |
| 1 | 1 | 1 | 2 | 7 |
| 2 | 1 | 1 | 8 | 1 |
| 3 | 1 | 1 | 7 | 2 |

FIG. 6d

|  | Bin to which level is mapped | Prev_Level | Context = (bin_nr - 1) * Max_Level + Prev_Level |
|---|---|---|---|
| | 1 | 1 | 1 |
| Max_Bin_Level = 3 | 2 | 1 | 6 |
| Max_Level = 5 | ≥ 3 | 1 | 11 |
| | 1 | 2 | 2 |
| | 2 | 2 | 7 |
| | ≥ 3 | 2 | 12 |
| | 1 | 3 | 3 |
| | 2 | 3 | 8 |
| | ≥ 3 | 3 | 13 |
| | 1 | 4 | 4 |
| | 2 | 4 | 9 |
| | ≥ 3 | 4 | 14 |
| | 1 | ≥ 5 | 5 |
| | 2 | ≥ 5 | 10 |
| | ≥ 3 | ≥ 5 | 15 |

Context Mapping Table

FIG. 7b

| | Bin to which run is mapped | Level associated with run | Context = (bin_nr - 1) * Max_RunL + Level |
|---|---|---|---|
| | 1 | 1 | 1 |
| Max_Bin_Run = 3 | 2 | 1 | 5 |
| Max_RunL = 4 | ≥ 3 | 1 | 9 |
| | 1 | 2 | 2 |
| | 2 | 2 | 6 |
| | ≥ 3 | 2 | 10 |
| | 1 | 3 | 3 |
| | 2 | 3 | 7 |
| | ≥ 3 | 3 | 11 |
| | 1 | ≥ 4 | 4 |
| | 2 | ≥ 4 | 8 |
| | ≥ 3 | ≥ 4 | 12 |

FIG. 8a

METHOD AND SYSTEM FOR CONTEXT-BASED ADAPTIVE BINARY ARITHMETIC CODING

This patent application is based on and claims priority to U.S. Provisional Application No. 60/322,112, filed Sep. 14, 2001.

FIELD OF THE INVENTION

The present invention relates generally to the compression of still images and video sequences and, more particularly, to a method and system for context-based adaptive binary arithmetic coding.

BACKGROUND OF THE INVENTION

A digital image in uncompressed form comprises an array of image pixels or picture elements. For example, in a commonly used digital image format, known as the Quarter Common Interchange Format (QCIF), an image, or frame, comprises 25,344 pixels arranged in an array 176×144 pixels. Each pixel, in turn, is represented by a certain number of bits, which carry information about the brightness (luminance) and/or color (chrominance) of the pixel. Different schemes exist for representing the luminance and/or chrominance of pixels in a digital image. Commonly, a so-called YUV color model is used. The luminance, or Y, component represents the luminance of the pixel, while the color of the pixel is represented by two chrominance or color difference components, labelled U and V. Other color models, such as RGB (Red, Green, Blue) color models, which are based on components representing the three primary colors of light, are also commonly used. However, color models based on a luminance/chrominance representation provide advantages compared with color models based on primary colors. These stem from the nature of the human visual system, which is more sensitive to intensity variations than it is to color variations. YUV color models typically exploit this property by using a lower spatial resolution for the chrominance components (U, V) than for the luminance component (Y). In this way the amount of information needed to represent the color information in an image can be reduced without a noticeable reduction in perceived image quality.

The lower spatial resolution of the chrominance components is usually attained by sub-sampling. Typically, a block of 16×16 image pixels is represented by four blocks of 8×8 pixels comprising luminance information and the corresponding chrominance components are each represented by one block of 8×8 pixels representing an area of the image equivalent to that of the 16×16 pixels in the luminance component. The chrominance components are thus spatially sub-sampled by a factor of 2 in the x and y directions. The resulting assembly of four 8×8 pixel luminance blocks and two spatially corresponding 8×8 pixel chrominance blocks is commonly referred to as a YUV macroblock, or macroblock, for short. A QCIF image comprises 11×9 such macroblocks. If the luminance blocks and chrominance blocks are represented with 8 bit resolution (that is by numbers in the range 0 to 255), the total number of bits required to represent the luminance and chrominance information associated with each macroblock is 6×(8×8×8)=3072 bits. Thus, the number of bits needed to represent an image in QCIF format is 99×3072=304,128 bits.

It should be appreciated that even in the situation described above, where both chrominance components of a digital color image are sub-sampled by a factor of two, an uncompressed image of only moderate size (e.g. 176×144 pixels) requires a large number of bits for its representation. This means that the amount of memory required to store digital images in uncompressed form is excessive. Furthermore, if still images are to be transferred, for example over a data communications network having a moderate or low available bandwidth, transmission times may become lengthy, or the network may become congested. Bandwidth requirements are even more severe if it is desired to transmit a series of images as a digital video sequence in real time. For example, transmission of a digital video sequence comprising a series of images in uncompressed QCIF format, represented using a YUV color model, at a rate of 30 frames per second, requires more than 9 Mbits/s (million bits per second). Such a high data rate is generally impractical for use in video recording, transmission and display applications because of the very large storage capacity, transmission channel capacity and hardware performance required. If a video sequence is to be transmitted in real-time over a fixed line network such as an ISDN (Integrated Services Digital Network) or a PSTN (Public Service Telephone Network), the available data transmission bandwidth is typically of the order of 64 kbits/s. In mobile video-telephony, where transmission takes place at least in part over a radio communications link, the available bandwidth can be as low as 20 kbits/s. This means that a significant reduction in the amount of information used to represent video data must be achieved in order to enable transmission of digital images or video sequences over low bandwidth communication networks. It is nevertheless desirable that this reduction should be achieved without significantly degrading the quality of the images/video sequence.

Over the past years, a considerable amount of research work has been directed towards reducing the amount of data required to represent digital images and video sequences, resulting in the development of numerous different schemes and international standards for compressing digital still images and digital video. The basic approach to image compression used in almost all still image and video encoders existing today involves block-based transform coding. Typically, transform coding translates image data from a representation comprising pixel values to a form comprising a set of coefficient values, each of which is a weighting factor (multiplier) for a basis function of the transform in question. It can be shown that there is a considerable degree of spatial redundancy within a typical digital image. In practical terms, this means that in general the value of any pixel within an image is substantially the same as the value of other pixels in its immediate vicinity; that is, there is a significant degree of correlation between pixel values. It is further known that when certain mathematical transformations, such as the two-dimensional Discrete Cosine Transform (DCT), are performed on image data, this spatial redundancy is reduced significantly, thereby producing a more compact representation of the image data.

Block-based Transform Coding as Used in JPEG Still Image Coding

In still image compression, such as that performed according to the baseline mode of the widely-used JPEG standard, an image to be coded is first divided into an array of non-overlapping square blocks, each block comprising, for example, an 8×8 array of image pixels. In the case of the JPEG baseline, a two-dimensional Discrete Cosine Transform (DCT) is then applied independently to each of the image blocks. This has the effect of converting the image data from the pixel value domain to the spatial frequency domain and to produce a corresponding set of coefficient values, each of which is a weighting factor for a basis function of the two-dimensional DCT. The coefficient values thus produced are quantized and then coded in a lossless manner using entropy coding to further reduce the amount of data (i.e. number of bits) required for their representation. According to the JPEG baseline, the entropy coder employs only Huffman coding to produce a compressed bit-stream, although in other modes arithmetic coding may alternatively be used. Finally, data describing image and coding parameters (e.g. type of compression, quantization and coding tables, image size, etc.) is embedded in the bit-stream produced by the entropy encoder. As the JPEG standard comprises four alternative coding modes and places few constraints on the quantization and coding tables that can be used, this is necessary in order to enable JPEG compressed bit-streams to be interchanged among different platforms and for images to be reconstructed without any ambiguity.

A digital video sequence, like an ordinary motion picture recorded on film, comprises a sequence of still images (often referred to as 'frames'), the illusion of motion being created by displaying the frames one after the other at a relatively fast rate, typically 15 to 30 frames per second. As in any still image, the pixel values of an individual frame within a digital video sequence exhibit considerable spatial redundancy. Therefore, the frames of a digital video sequence are amenable to block-based transform coding, just like individual still images.

Images in the consecutive frames of a video sequence also tend to be quite similar and thus the overall change between one video frame and the next is rather small. This means that there is considerable temporal redundancy within a typical digital video sequence. For example, a scene may comprise some stationary elements, such as background scenery, and some moving areas, for example the face of a newsreader. In consecutive frames of the sequence, it is likely that the background will remain unaltered and the only movement in the scene will be due to changes in facial expression of the newsreader. Thus, when forming a compressed representation of a video sequence there is also a possibility to use techniques which reduce the temporal redundancy of the image data of the sequence in addition to methods that reduce spatial redundancy, thereby allowing further data compression to be achieved.

Hybrid Video Encoder/Decoder

State of the art video coding systems make use of a technique known as 'motion-compensated prediction', to reduce the temporal redundancy in video sequences. Using motion-compensated prediction, the image content of some (often many) frames in a digital video sequence is 'predicted' from one or more other frames in the sequence, known as 'reference frames'. Prediction of image content is achieved by tracing the motion of objects or regions of an image between a frame to be coded (compressed) and the reference frame(s) using 'motion vectors'. In general, the reference frame(s) may precede the frame to be coded or may follow it in the video sequence. However, as will become apparent from discussions later in the text, it is not appropriate (or possible) to apply motion-compensated prediction to all frames of a video sequence and thus at least two types of encoding are used in state of the art video coding systems.

Frames of a video sequence which are compressed using motion-compensated prediction are generally referred to as INTER-coded or P-frames. Motion-compensated prediction alone rarely provides a sufficiently precise representation of the image content of a video frame and therefore it is typically necessary to provide a so-called 'prediction error' (PE) frame with each INTER-coded frame. As will be explained in greater detail later in the text, the prediction error frame represents the difference between a decoded version of the INTER-coded frame and the image content of the frame to be coded. More specifically, the prediction error frame comprises values that represent the difference between pixel values in the frame to be coded and corresponding reconstructed pixel values formed on the basis of a predicted (INTER-coded) version of the frame in question. Consequently, the prediction error frame has characteristics similar to a still image and block-based transform coding can be applied in order to reduce the amount of data (number of bits) required to represent it.

Frames of a video sequence which are not compressed using motion-compensated prediction are referred to as INTRA-coded or I-frames. Generally, INTRA-coded frames are produced by applying block-based transform coding directly to the pixel values of the frame to be coded. Additionally, where possible, blocks of INTRA-coded frames are predicted from previously coded blocks within the same frame. This technique, known as INTRA-prediction, has the effect of further reducing the amount of data required to represent an INTRA-coded frame.

In order to illustrate principles of block-based transform coding and motion-compensated prediction in greater detail, reference will now be made to FIG. 1, which is a schematic of a generic hybrid video encoder that employs a combination of INTRA- and INTER-coding to produce a compressed (encoded) video bit-stream. A corresponding decoder is illustrated in FIG. 2 and will be described later in the text.

The video encoder 300 comprises an input 301 for receiving a digital video signal from a camera or other video source (not shown). It also comprises a transformation unit 304 which is arranged to perform a block-based discrete cosine transform (DCT), a quantizer 306, an inverse quantizer 308, an inverse transformation unit 310, arranged to perform an inverse block-based discrete cosine transform (IDCT), combiners 312 and 316, and a frame store 320. The encoder further comprises a motion estimator 330, a motion field coder 340 and a motion compensated predictor 350. Switches 302 and 314 are operated co-operatively by control manager 360 to switch the encoder between an INTRA-mode of video encoding and an INTER-mode of video encoding. The encoder 300 also comprises a video multiplex coder 370 which forms a single bit-stream from the various types of information produced by the encoder 300 for further transmission to a remote receiving terminal or, for example, for storage on a mass storage medium, such as a computer hard drive (not shown).

Encoder 300 operates as follows. Each frame of uncompressed video provided from the video source to input 301 is received and processed macroblock-by-macroblock, preferably in raster-scan order. When the encoding of a new video sequence starts, the first frame of the sequence is encoded as an INTRA-coded frame. Subsequently, the encoder is programmed to code each frame in INTER-coded format, unless one of the following conditions is met: 1) it is judged that the current frame being coded is so dissimilar from the reference frame used in its prediction that excessive prediction error information is produced; 2) a predefined INTRA frame repetition interval has expired; or 3) feedback is received from a receiving terminal indicating a request for a frame to be provided in INTRA-coded format.

The occurrence of condition 1) is detected by monitoring the output of the combiner 316. The combiner 316 forms a difference between the current macroblock of the frame being coded and its prediction, produced in the motion compensated prediction block 350. If a measure of this difference (for example a sum of absolute differences of pixel values) exceeds a predetermined threshold, the combiner 316 informs the control manager 360 via a control line 319 and the control manager 360 operates the switches 302 and 314 via control line 313 so as to switch the encoder 300 into INTRA-coding mode. Occurrence of condition 2) is monitored by means of a timer or frame counter implemented in the control manager 360, in such a way that if the timer expires, or the frame counter reaches a predetermined number of frames, the control manager 360 operates the switches 302 and 314 via control line 313 to switch the encoder into INTRA-coding mode. Condition 3) is triggered if the control manager 360 receives a feedback signal from, for example, a receiving terminal, via control line 321 indicating that an INTRA frame refresh is required by the receiving terminal. Such a condition may arise, for example, if a previously transmitted frame is badly corrupted by interference during its transmission, rendering it impossible to decode at the receiver. In this situation, the receiving decoder issues a request for the next frame to be encoded in INTRA-coded format, thus re-initialising the coding sequence.

Operation of the encoder 300 in INTRA-coding mode will now be described. In INTRA-coding mode, the control manager 360 operates the switch 302 to accept video input from input line 318. The video signal input is received macroblock by macroblock from input 301 via the input line 318. As they are received, the blocks of luminance and chrominance values which make up the macroblock are passed to the DCT transformation block 304, which performs a 2-dimensional discrete cosine transform on each block of values, producing a 2-dimensional array of DCT coefficients for each block. In a situation such as that described earlier, where each macroblock comprises four 8×8 pixel blocks of luminance values and two spatially corresponding 8×8 pixel blocks of chrominance values, DCT transformation block 304 produces an 8×8 array of coefficient values for each block.

The DCT coefficients for each block are passed to the quantizer 306, where they are quantized using a quantization parameter QP. Selection of the quantization parameter QP is controlled by the control manager 360 via control line 315. Quantization introduces a loss of information, as the quantized coefficients have a lower numerical precision than the coefficients originally generated by the DCT transformation block 304. This provides a further mechanism by which the amount of data required to represent each image of the video sequence can be reduced. However, unlike the DCT transformation, which is essentially lossless, the loss of information introduced by quantization causes an irreversible degradation in image quality. The greater the degree of quantization applied to the DCT coefficients, the greater the loss of image quality.

The quantized DCT coefficients for each block are passed from the quantizer 306 to the video multiplex coder 370, as indicated by line 325 in FIG. 1. The video multiplex coder 370 orders the transform coefficients for each block using a zigzag scanning procedure. This operation converts the two-dimensional array of quantized transform coefficients into a one-dimensional array. Typical zigzag scanning orders, such as that shown in FIG. 3, order the coefficients approximately in ascending order of spatial frequency. This also tends to order the coefficients according to their values, such that coefficients positioned earlier in the one-dimensional array are more likely to have larger absolute values than coefficients positioned later in the array. This is because lower spatial frequencies tend to have higher amplitudes within the image blocks. Consequently, the last values in the one-dimensional array of quantized transform coefficients are commonly zeros.

Run-Level Coding of DCT Transform Coefficients

Typically, the video multiplex coder 370 represents each non-zero quantized coefficient in the one dimensional array by two values, referred to as level and run. Level is the value of the quantized coefficient and run is the number of consecutive zero-valued coefficients preceding the coefficient in question. The run and level values for a given coefficient are ordered such that the level value precedes the associated run value. A level value equal to zero is used to indicate that there are no more non-zero coefficient values in the block. This 0-level value is referred to as an EOB (end-of-block) symbol.

Entropy Coding

The run and level values are further compressed in the video multiplex coder 370 using entropy coding. Entropy coding is a lossless operation, which exploits the fact that symbols within a data set to be coded generally have different probabilities of occurrence. Therefore, instead of using a fixed number of bits to represent each symbol, a variable number of bits is assigned such that symbols which are more likely to occur are represented by code-words having fewer bits. For this reason, entropy coding is often referred to as Variable Length Coding (VLC). Since certain values of levels and runs are more likely than other values to occur, entropy coding techniques can be used effectively to reduce the number of bits required to represent the run and level values. A number of different methods can be used to implement entropy coding. For example, entropy coding of the run and level parameters may be implemented by means of look-up tables which define the mapping between each possible symbol in the data set to be coded and its corresponding variable length code. Such look-up tables are often defined by statistical analysis of training material comprising symbols identical to those to be coded and having similar statistical properties. An alternative technique, known as arithmetic coding, can also be used to convert the run and level values into variable length code-words. In arithmetic coding a group of symbols, for example the run and level values for a block of quantized transform coefficients, are coded as a floating point decimal number.

Once the run and level values have been entropy coded using an appropriate method, the video multiplex coder further combines them with control information, also entropy coded using a variable length coding method appropriate for the kind of information in question, to form a single compressed bit-stream of coded image information 335.

A locally decoded version of the macroblock is also formed in the encoder 300. This is done by passing the quantized transform coefficients for each block, output by quantizer 306, through inverse quantizer 308 and applying an inverse DCT transform in inverse transformation block 310. In this way a reconstructed array of pixel values is constructed for each block of the macroblock. The resulting decoded image data is input to combiner 312. In INTRA-coding mode, switch 314 is set so that the input to the combiner 312 via switch 314 is zero. In this way, the operation performed by combiner 312 is equivalent to passing the decoded image data unaltered.

As subsequent macroblocks of the current frame are received and undergo the previously described encoding and decoding steps in blocks 304, 306, 308, 310 and 312, a decoded version of the INTRA-coded frame is built up in frame store 320. When the last macroblock of the current frame has been INTRA-coded and subsequently decoded, the frame store 320 contains a completely decoded frame, available for use as a prediction reference frame in coding a subsequently received video frame in INTER-coded format.

Operation of the encoder 300 in INTER-coding mode will now be described. In INTER-coding mode, the control manager 360 operates switch 302 to receive its input from line 317, which comprises the output of combiner 316. The combiner 316 receives the video input signal macroblock by macroblock from input 301. As combiner 316 receives the blocks of luminance and chrominance values which make up the macroblock, it forms corresponding blocks of prediction error information. The prediction error information represents the difference between the block in question and its prediction, produced in the motion compensated prediction block 350. More specifically, the prediction error information for each block of the macroblock comprises a two-dimensional array of values, each of which represents the difference between a pixel value in the block of luminance or chrominance information being coded and a decoded pixel value obtained by forming a motion-compensated prediction for the block, according to the procedure described below. Thus, in a situation where each macroblock comprises four 8×8 pixel blocks of luminance values and two spatially corresponding 8×8 pixel blocks of chrominance values, the prediction error information for the macroblock similarly comprises four 8×8 blocks of luminance prediction error values and two spatially corresponding 8×8 blocks of chrominance prediction error values.

The prediction error information for each block of the macroblock is passed to DCT transformation block 304, which performs a two-dimensional discrete cosine transform on each block of prediction error values to produce a two-dimensional array of DCT transform coefficients for each block. Thus, in a situation where the prediction error information for each macroblock comprises four 8×8 blocks of luminance prediction error values and two spatially corresponding 8×8 blocks of chrominance prediction error values, DCT transformation block 304 produces an 8×8 array of transform coefficient values for each prediction error block. The transform coefficients for each prediction error block are passed to quantizer 306 where they are quantized using a quantization parameter QP, in a manner analogous to that described above in connection with operation of the encoder in INTRA-coding mode. Again, selection of the quantization parameter QP is controlled by the control manager 360 via control line 315.

The quantized DCT coefficients representing the prediction error information for each block of the macroblock are passed from quantizer 306 to video multiplex coder 370, as indicated by line 325 in FIG. 1. As in INTRA-coding mode, the video multiplex coder 370 orders the transform coefficients for each prediction error block using the previously described zigzag scanning procedure (see FIG. 3) and then represents each non-zero quantized coefficient as a level and a run value. It further compresses the run and level values using entropy coding, in a manner analogous to that described above in connection with INTRA-coding mode. Video multiplex coder 370 also receives motion vector information (described in the following) from motion field coding block 340 via line 326 and control information from control manager 360. It entropy codes the motion vector information and forms a single bit-stream of coded image information, 335 comprising the entropy coded motion vector, prediction error and control information.

The quantized DCT coefficients representing the prediction error information for each block of the macroblock are also passed from quantizer 306 to inverse quantizer 308. Here they are inverse quantized and the resulting blocks of inverse quantized DCT coefficients are applied to inverse DCT transform block 310, where they undergo inverse DCT transformation to produce locally decoded blocks of prediction error values. The locally decoded blocks of prediction error values are then input to combiner 312. In INTER-coding mode, switch 314 is set so that the combiner 312 also receives predicted pixel values for each block of the macroblock, generated by motion-compensated prediction block 350. The combiner 312 combines each of the locally decoded blocks of prediction error values with a corresponding block of predicted pixel values to produce reconstructed image blocks and stores them in frame store 320.

As subsequent macroblocks of the video signal are received from the video source and undergo the previously described encoding and decoding steps in blocks 304, 306, 308, 310, 312, a decoded version of the INTER-coded frame is built up in frame store 320. When the last macroblock of the frame has been INTER-coded and subsequently decoded, the frame store 320 contains a completely decoded frame, available for use as a prediction reference frame in encoding a subsequently received video frame in INTER-coded format.

Formation of a prediction for a macroblock of the current frame will now be described. Any frame encoded in INTER-coded format requires a reference frame for motion-compensated prediction. This means, necessarily, that when encoding a video sequence, the first frame to be encoded, whether it is the first frame in the sequence, or some other frame, must be encoded in INTRA-coded format. This, in turn, means that when the video encoder 300 is switched into INTER-coding mode by control manager 360, a complete reference frame, formed by locally decoding a previously encoded frame, is already available in the frame store 320 of the encoder. In general, the reference frame is formed by locally decoding either an INTRA-coded frame or an INTER-coded frame.

The first step in forming a prediction for a macroblock of the current frame is performed by motion estimation block 330. The motion estimation block 330 receives the blocks of luminance and chrominance values which make up the current macroblock of the frame to be coded via line 328. It then performs a block matching operation in order to identify a region in the reference frame which corresponds substantially with the current macroblock. In order to perform the block matching operation, motion field estimation block accesses reference frame data stored in frame store 320 via line 327. More specifically, motion estimation block 330 performs block-matching by calculating difference values (e.g. sums of absolute differences) representing the difference in pixel values between the macroblock under examination and candidate best-matching regions of pixels from a reference frame stored in the frame store 320. A difference value is produced for candidate regions at all possible offsets within a predefined search region of the reference frame and motion estimation block 330 determines the smallest calculated difference value. The offset between the macroblock in the current frame and the candidate block of pixel values in the reference frame that yields the smallest difference value defines the motion vector for the macroblock in question.

Once the motion estimation block 330 has produced a motion vector for the macroblock, it outputs the motion vector to the motion field coding block 340. The motion field coding block 340 approximates the motion vector received from motion estimation block 330 using a motion model comprising a set of basis functions and motion coefficients. More specifically, the motion field coding block 340 represents the motion vector as a set of motion coefficient values which, when multiplied by the basis functions, form an approximation of the motion vector. Typically, a translational motion model having only two motion coefficients and basis functions is used.

The motion coefficients are passed from motion field coding block 340 to motion compensated prediction block 350. Motion compensated prediction block 350 also receives the best-matching candidate region of pixel values identified by motion estimation block 330 from frame store 320. Using the approximate representation of the motion vector generated by motion field coding block 340 and the pixel values of the best-matching candidate region of pixels from the reference frame, motion compensated prediction block 350 generates an array of predicted pixel values for each block of the macroblock. Each block of predicted pixel values is passed to combiner 316 where the predicted pixel values are subtracted from the actual (input) pixel values in the corresponding block of the current macroblock. In this way a set of prediction error blocks for the macroblock is obtained.

Operation of the video decoder 400, shown in FIG. 2 will now be described. The decoder 400 comprises a video multiplex decoder 470, which receives an encoded video bit-stream 335 from the encoder 300 and demultiplexes it into its constituent parts, an inverse quantizer 410, an inverse DCT transformer 420, a motion compensated prediction block 440, a frame store 450, a combiner 430, a control manager 460, and an output 480.

The control manager 460 controls the operation of the decoder 400 in response to whether an INTRA- or an INTER-coded frame is being decoded. An INTRA/INTER trigger control signal, which causes the decoder to switch between decoding modes is derived, for example, from picture type information provided in a header portion of each compressed video frame received from the encoder. The INTRA/INTER trigger control signal is extracted from the encoded video bit-stream by the video multiplex decoder 470 and is passed to control manager 460 via control line.

Decoding of an INTRA-coded frame is performed on a macroblock-by-macroblock basis, each macroblock being decoded substantially as soon as encoded information relating to it is identified in the received video bit-stream 335. The video multiplex decoder 470 first separates the encoded information for the blocks of the macroblock from possible control information relating to the macroblock in question. The encoded information for each block of an INTRA-coded macroblock comprises variable length code-words. These code-words represent the entropy coded level and run values for the non-zero quantized DCT coefficients of the block. The video multiplex decoder 470 decodes the variable length code-words using a variable length decoding method corresponding to the encoding method used in the encoder 300 and thereby recovers the level and run values. It then reconstructs the array of quantized transform coefficient values for each block of the macroblock and passes them to inverse quantizer 410. Any control information relating to the macroblock is also decoded in the video multiplex decoder using an appropriate variable length decoding method and is passed to control manager 460. In particular, information relating to the level of quantization applied to the transform coefficients is extracted from the encoded bit-stream by video multiplex decoder 470 and is provided to control manager 460 via control line 324. The control manager, in turn, conveys this information to inverse quantizer 420 via control line. Inverse quantizer 410 inverse quantizes the quantized DCT coefficients for each block of the macroblock according to the control information and provides the now inverse quantized DCT coefficients inverse DCT transformer 420.

Inverse DCT transformer 420 performs an inverse DCT transform on the inverse quantized DCT coefficients for each block of the macroblock to form a decoded block of image information comprising reconstructed pixel values. As motion-compensated prediction is not used in the encoding/decoding of INTRA-coded macroblocks, control manager 460 controls combiner 430 in such a way as to prevent any reference information being used in the decoding of the INTRA-coded macroblock. The reconstructed pixel values for each block of the macroblock are passed to the video output 480 of the decoder where, for example, they can be provided to a display device (not shown). The reconstructed pixel values for each block of the macroblock are also stored in frame store 450. As subsequent macroblocks of the INTRA-coded frame are decoded and stored, a decoded frame is progressively assembled in the frame store 450 and thus becomes available for use as a reference frame for motion compensated prediction in connection with the decoding of subsequently received INTER-coded frames.

INTER-coded frames are also decoded macroblock by macroblock, each INTER-coded macroblock being decoded substantially as soon as encoded information relating to it is identified in the received bit-stream. The video multiplex decoder 470 separates the encoded prediction error information for each block of the INTER-coded macroblock from encoded motion vector information and possible control information relating to the macroblock in question. As explained in the foregoing, the encoded prediction error information for each block of the macroblock comprises variable length codewords which represent the entropy coded level and run values for the non-zero quantized transform coefficients for the prediction error block in question. The video multiplex decoder 470 decodes the variable length code-words using a variable length decoding method corresponding to the encoding method used in the encoder 300 and thereby recovers the level and run values. It then reconstructs an array of quantized transform coefficient values for each prediction error block and passes them to inverse quantizer 410. Control information relating to the INTER-coded macroblock is also decoded in the video multiplex decoder using an appropriate variable length decoding method and is passed to control manager 460. Information relating to the level of quantization applied to the transform coefficients of the prediction error blocks is extracted from the encoded bit-stream and provided to control manager 460 via control line 324. The control manager, in turn, conveys this information to inverse quantizer 410 via control line. Inverse quantizer 410 inverse quantizes the quantized DCT coefficients representing the prediction error information for each block of the macroblock according to the control information and provides the now inverse quantized DCT coefficients to inverse DCT transformer 420. The inverse quantized DCT coefficients representing the prediction error information for each block are then inverse transformed in the inverse DCT transformer 420 to yield an array of reconstructed prediction error values for each block of the macroblock.

The encoded motion vector information associated with the macroblock is extracted from the encoded video bit-stream 335 by video multiplex decoder 470 and is decoded using an appropriate variable length decoding method. The decoded motion vector information thus obtained is passed via data line 326 to motion compensated prediction block 440, which reconstructs a motion vector for the macroblock using the same motion model as that used to encode the INTER-coded macroblock in encoder 300. The reconstructed motion vector approximates the motion vector originally determined by motion estimation block 330 of the encoder. The motion compensated prediction block 440 of the decoder uses the reconstructed motion vector to identify the location of a region of reconstructed pixels in a prediction reference frame stored in frame store 450. The reference frame may be, for example, a previously decoded INTRA-coded frame, or a previously decoded INTER-coded frame. In either case, the region of pixels indicated by the reconstructed motion vector is used to form a prediction for the macroblock in question. More specifically, the motion compensated prediction block 440 forms an array of pixel values for each block of the macroblock by copying corresponding pixel values from the region of pixels identified in the reference frame. The prediction, that is the blocks of pixel values derived from the reference frame, are passed from motion compensated prediction block 440 to combiner 430 where they are combined with the decoded prediction error information. In practice, the pixel values of each predicted block are added to corresponding reconstructed prediction error values output by inverse DCT transformer 420. In this way an array of reconstructed pixel values for each block of the macroblock is obtained. The reconstructed pixel values are passed to the video output 480 of the decoder and are also stored in frame store 450. As subsequent macroblocks of the INTER-coded frame are decoded and stored, a decoded frame is progressively assembled in the frame store 450 and thus becomes available for use as a reference frame for motion-compensated prediction of other INTER-coded frames.

H.26L Video Coding Standard

ITU-T recommendation H.26L is the latest in a family of video coding standards developed by the International Telecommunications Union. It is intended in particular for video coding at very low bit rates, typically below 64 kbits/s, which makes it especially suitable for the coding of digital video for transmission via radio communication networks or any fixed line communication network in which optimal use of available bandwidth is a priority. The video encoding system defined by ITU-T H.26L is a hybrid video coding system, which operates according to the general principles described above in connection with the generic video encoder 300 and decoder 400 illustrated in FIGS. 1 and 2. In particular, a video encoding system implemented according to H.26L employs a combination of block-based transform coding and motion-compensated prediction to reduce the spatial and temporal redundancy within video sequences.

The latest version of the H.26L recommendation, known as Test Model 8 (TML8) and described in "H.26L Test Model Long Term Number 8 (TML-8) draft0" (ITU-T Telecommunications Standardization Section, Study Group 16, Video Coding Experts Group), specifies two alternative entropy coding modes. In the first (default) mode a so-called Universal Variable Length Coding (UVLC) method is used to encode all syntax elements. The UVLC coding mode is a look-up table method in which the same set of variable length code-words is used to represent all the different kinds of information produced by the video encoder, regardless of the type of information in question. The alternative entropy coding method, specified for use in the so-called high complexity profile of H.26L, is a technique known as Context-based Adaptive Binary Arithmetic Coding (CABAC). This is a form of binary arithmetic coding which continually adapts to the statistical properties of the information being coded and is known in the art to be one of the most efficient forms of entropy coding (see H. Witten, R. M. Neal, and J. G. Cleary, "Arithmetic coding for data compression," Commun. ACM, vol. 30, pp. 520–540, June 1987).

Because UVLC entropy coding uses the same set of variable length code-words to represent all types of information produced by the video encoder, in general the statistical properties of the code-words do not match optimally with the characteristics of the information to be encoded. For example, the frequency of occurrence of particular run and level values used to represent the quantized DCT coefficients for an INTRA-coded image block is likely to be different from the occurrence of values in control information relating to quantization parameter values. The CABAC entropy coding method was introduced into the H.26L recommendation in order to overcome the inherently sub-optimal nature of the UVLC entropy coding method. As explained earlier in the text, arithmetic coding represents a group of symbols to be coded with a single variable length code (a floating-point number). This provides particular advantages compared with entropy coding methods, which encode each symbol independently. Specifically, entropy coding methods which encode each symbol independently require at least one bit to represent each symbol. Because arithmetic coding represents groups of symbols with a single code-word, it is possible to achieve data compression rates of less than one bit per symbol. Thus the CABAC method provided in H.26L also provides the possibility of improved data compression. Furthermore, because it is an adaptive method, it is also able to take into account changes in the statistical characteristics of the information being coded, ensuring that data compression performance is maintained even if the nature of the data being encoded changes to some extent.

Context-Based Arithmetic Coding

As explained above, CABAC arithmetic coding is an entropy coding method, which is able to adapt to changing statistics of the information to be encoded. In this way it is capable of providing improved compression efficiency compared with entropy coding techniques which assume fixed statistical properties. FIG. 4 illustrates an exemplary context-based binary arithmetic encoder 700. CABAC is a binary arithmetic coding method and thus data symbols to be coded which have non-binary values are first converted to binary values ('binarized') in binary mapping block 710. The binarization process involves mapping a symbol to be coded to a sequence of bins, each of which has a corresponding bin number and can be assigned a value of either 0 or 1. An example of such a mapping is given below in Table 1. In principle other binarization schemes can be envisaged.

TABLE 1

| value | Bin Sequence | | | | | | |
|---|---|---|---|---|---|---|---|
| 0 | 1 | | | | | | |
| 1 | 0 | 1 | | | | | |
| 2 | 0 | 0 | 1 | | | | |
| 3 | 0 | 0 | 0 | 1 | | | |
| 4 | 0 | 0 | 0 | 0 | 1 | | |
| 5 | 0 | 0 | 0 | 0 | 0 | 1 | |
| 6 | 0 | 0 | 0 | 0 | 0 | 0 | 1 |
| ... | . | . | . | . | . | . | . |
| bin_nr. | 1 | 2 | 3 | 4 | 5 | 6 | 7 |

In the CABAC method each of the bins is assigned to a so-called 'context' (hence the name context-based arithmetic coding). A context can be thought of as grouping together bins, which have similar statistical characteristics. In other words, each bin assigned to a particular context is assumed to have a similar probability of containing the value 1 or 0 as the other bins belonging to that context. In this way, the probability estimates used to generate code-words in the arithmetic coder are defined for each context rather than for each possible bin to be encoded. Each context is defined according to a 'context model', established in advance and based on information about the statistical characteristics of the data symbols (and thus the bins) to be encoded. Generally, the data compression ratio achieved by a binary arithmetic encoder is enhanced if the difference between the probability of occurrence of a 0 and probability of occurrence of a 1 is maximised. In a similar way, the performance of a context-based arithmetic coding also depends on the choice of context model. This means that, in general, context models should be chosen so as to maximise the difference between the probability of occurrence of 0's and 1's for the bins assigned to each context.

In the exemplary context-based arithmetic coder illustrated in FIG. 4, once a symbol to be coded has been binarized in binary mapping block 710 it is assigned to a corresponding context in context assignment block 720. The value assigned to the corresponding bin (i.e., 1 or 0) is then passed to the arithmetic coder 730. The coding engine 750 of arithmetic coder 730 then encodes the bin value using a probability estimate for the context to which the bin is assigned. The performance, that is the data compression ratio achieved by the arithmetic encoder, depends on the accuracy of the probability estimates. In principle, the estimates may be fixed or adaptive. If fixed probability estimates are used, the probability estimates for each context are assigned to predefined values and remain unchanged during the encoding process. Fixed probability estimates are typically obtained in advance by analysing training material having statistical properties similar to those of the actual data to be encoded. If adaptive probability estimates are used, fixed values are used to initialise the probability estimates for each context and the probabilities are then updated throughout the encoding process based on the actual statistical properties of the data (bins) encoded so far. Adaptive probability estimates generally perform better since they can adjust to the material being encoded.

The exemplary context-based arithmetic coder illustrated in FIG. 4 employs adaptive probability estimates and comprises a probability estimation block 740 where updated probability estimates are calculated. The probability estimates for each context are updated by keeping a record of the number of occurrences of 1 and 0 for each of the bins assigned to each context. For example, if the bins assigned to an arbitrary context k have been assigned the value 0 m times and the value 1 n times, then the probability estimate for 1 in context k is $n/(n(m+1))$ and the probability estimate for 0 is $(m+1)/(n(m+1))$.

FIG. 5 illustrates a context-based arithmetic decoder 800 corresponding to the encoder described in connection with FIG. 4. A bit-stream representing arithmetic coded data symbols is received by the context-based arithmetic decoder at input 810. Initially, based on the previously decoded symbols, a context is calculated in a context assignment block 850 and the probability estimates of the bin values are updated. Context assignment, as carried out in the context assignment block 850, and calculation of probability estimates, as carried out in the probability estimation block 830, are done in the same manner as the encoder. The received bits are then fed into an arithmetic decoding engine 840 of the arithmetic decoder 820, where they are converted to decoded bin values, using the calculated context and the current probability estimates of the bin values. Decoded bins are mapped to the values of the runs and levels in a bin-to-value mapping block 860.

CABAC Method as Used in H.26L

The details of the CABAC arithmetic coding method adopted for use in the high complexity profile of ITU-T recommendation H.26L will now be described in detail. According to H.26L TML8, the contexts for run and level values depend on the type of block being encoded and the bin number of the binarized level or run value. Different block types are defined according to the scanning mode (single/double) used to order the coefficient values, the component type (luminance/chrominance, AC/DC), or the coding mode (INTER/INTRA). However, for a given block type, the context depends only on the bin number. More specifically, according to H.26L TML8 four contexts are defined for level encoding. The first one is for the first bin, the second is for the second bin, while the third context is for the rest of the bins representing the magnitude of the level. The remaining context is used for the sign of the level. A similar approach is used to assign run values to contexts. For runs there are three contexts, the first one for the first bin, the second for the second bin and the third for all remaining bins. As run values are always equal to or greater than zero, there is no need for an additional context to represent sign information. Thus, for a block of a given type, the assignment of bins to contexts for transform coefficient bins (for both level and run encoding) can be summarised as follows:

$$\text{if (bin\_nr > MAX\_BIN\_VAL)} \\ \quad \text{bin\_nr = MAX\_BIN\_VAL;} \\ \text{end} \\ \text{context = bin\_nr} \tag{1}$$

where bin_nr is the bin number and context is the context number. According to H.26L TML8, the value of MAX_BIN_VAL is set equal to 3, but in principle another MAX_BIN_VAL could be used instead.

A run-level pair is encoded as follows: The runs and levels are first classified according to block/coefficient type: scanning mode, coefficient type (DC/AC), and coding mode (INTER/INTRA or 16×16 INTRA). The levels and runs are then binarized by mapping them onto a sequence of bins and each bin is assigned to a context based on its bin number.

Figure 6C:
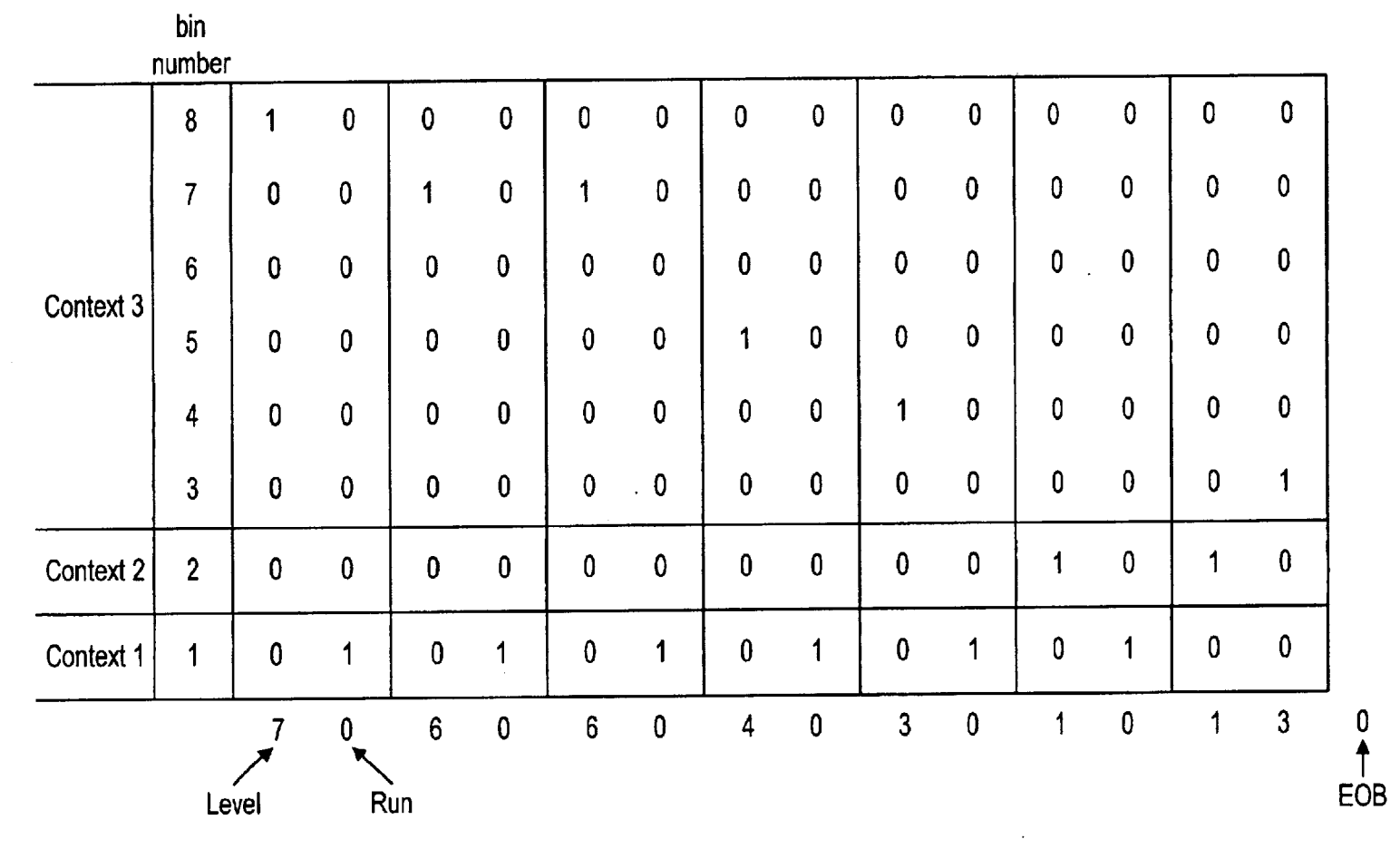

FIGS. 6a–6d illustrate this process in detail with reference to an exemplary 4×4 array of quantized DCT coefficients. It also demonstrates the adaptive nature of the CABAC method, by illustrating the way in which the statistical properties of run and level values for quantized DCT coefficients are tracked. The two-dimensional array of quantized DCT coefficient values is first zigzag scanned to produce a one-dimensional array of values, as indicated in FIG. 6a. The non-zero coefficient values in the one-dimensional array are then represented as pairs of run and level values. As previously explained, each level value represents the value of a non-zero quantized DCT coefficient, while the associated run value corresponds to the number of zero-valued coefficients preceding the coefficient in question. The run-level pairs derived from the exemplary array of quantized DCT coefficients are presented in FIG. 6b. In each pair the level value precedes the associated run value and a level value equal to zero is used as an end-of-block symbol to indicate that there are no more non-zero coefficient values in the block.

Next, each run and level value is converted into a binary value. According to H.26L TML8, the binarization scheme used to convert the run and level values for quantized DCT transform coefficient values is identical to that shown above in Table 1. FIG. 6c shows the result of applying the binarization scheme presented in Table 1 to the run and level values in the exemplary array. FIG. 6c also shows the assignment of bins to contexts according to H.26L. As described above, only three contexts are used to describe the magnitudes of the run and level values. The first context corresponds to bin 1, the second to bin 2, while the third context comprises all the remaining bins. In FIG. 6c, the contexts are delineated by bold horizontal lines. By examining FIG. 6c it can be seen that the majority of level values are mapped to bins which are assigned to context 3, while the majority of run values are mapped to bins which are assigned to context 1.

The probability estimates for each assigned context are updated after the encoding of the bins. Probability estimates for the run and level contexts are updated independently. As previously described, the probability estimate for a given context represents the statistical characteristics of the bins assigned to the context in question. More specifically, the probability estimate describes the likelihood of a bin assigned to the context containing a 1 or a 0. FIG. 6d describes, in an exemplary manner, the way in which the probability estimates are updated for runs and levels. The figure illustrates the probability of a bin assigned to a given run or level context containing a 1 or a 0 before and after the runs and levels representing the 4×4 block of quantized DCT coefficients shown in FIG. 6a are binarized and assigned to contexts and encoded in the arithmetic encoder. FIG. 6d takes the form of a table, which records the occurrence of 1's and 0's in the bins assigned to each context. Thus, the probability estimate for a given context is given by:

probability of 0=no. of 0's/(no. of 0's+no. of 1's)
probability of 1=no. of 1's/(no. of 0's+no. of 1's)

In the figure it is assumed that the 4×4 block of quantized DCT coefficients shown in FIG. 6a is the first such block to be processed. This means that there are no previous occurrences of 1's and 0's to record in the table. To overcome this problem it is assumed that before the block is processed, each context has an equal probability of containing a 1 or a 0. This is indicated by entering identical values in the columns that record the occurrence of 0's and 1's. In FIG. 6d, 1's are used to initialize the probability estimate. Alternatively, a probability estimate derived from analysis of training data could be used to intialize the probability estimates for each context. The probability estimates are then updated by counting the number of 1's and 0's which occur in the bins of each context as the run and level values for the block of quantized DCT transform coefficients are binarized and assigned to contexts. The right-hand column of FIG. 6d shows the situation after processing the 4×4 block of quantized DCT shown in FIG. 6a.

Although the CABAC arithmetic encoding method adopted in the high complexity profile of ITU-T recommendation H.26L TML8 provides an improvement in data compression compared with the UVLC entropy coding method, it is still not optimal with regard to coding efficiency. It is therefore an object of the invention to provide a method and system for context-based arithmetic coding, wherein coding efficiency is further improved.

SUMMARY OF THE INVENTION

The present invention is based on the realization that when coding a given data symbol using context-based arithmetic coding, an improvement in coding efficiency can be achieved by using context models which take into account the contexts to which other data symbols are assigned. With specific reference to the CABAC method used in the high complexity profile of H.26L TML8, the inventors of the present invention have determined that certain relationships exist between the run and level values associated with DCT transform coefficients. They have further determined that these relationships can be used to construct improved context models which enable the CABAC method to operate with improved coding efficiency when applied to the run and level values. In particular, the inventors have determined that consecutive level values exhibit a significant similarity. More specifically, within a given block of transform coefficients, the level of a coefficient to be encoded has, in general, a magnitude substantially similar to the level of the previously encoded coefficient. The inventors have also determined an inverse relationship between the level and run values. In particular, larger level values are more likely to be preceded by smaller run values. The converse is also true, namely smaller level values are likely to be preceded by larger runs. Consequently, the present invention proposes the creation of new context models for the coding of DCT transform coefficients, which take into account these relationships between level and run values.

In a first such context model, intended for implementation in a context-based arithmetic encoder, the context assigned to the bins of a binarized coefficient level value depends on the previously encoded coefficient level. In a second such context model, intended for implementation in a context-based arithmetic decoder, the context assigned to the bins of a binarized coefficient level value depends on the previously decoded coefficient level. In a third context model, implemented in either a context-based arithmetic encoder or a context-based arithmetic decoder, the context assigned to the bins of a binarized coefficient run value depends on the coefficient's level value.

The inventors have also determined that certain similarities exist between the transform coefficient values associated with different image blocks. These similarities are greater between image blocks which reside close to each other and tend to be strongest between immediately neighbouring image blocks. More specifically, the number $N_c$ of non-zero transform coefficient values representing a particular image block tends to be similar to the number of non-zero transform coefficient values in an image block close to, or neighbouring, the image block in question. Thus, the present invention further introduces the concept of providing an indication of the number of non-zero transform coefficients for a transform coded image block and encoding this value using entropy coding. Furthermore, if context-based arithmetic coding is used to encode the $N_c$ value, the inventors have determined that it is advantageous to assign the $N_c$ value of a block to a context by taking into account the context assigned to the $N_c$ value for at least one other transform coded image block. In this way the similarity between $N_c$ values between image blocks which reside close to each other can be taken advantage of in the context-based arithmetic coding procedure. According to ITU-T recommendation H.26L TML8, the number of non-zero transform coefficients in an image block is not encoded. Instead, and as previously explained, an end-of-block (EOB) indication is provided. The EOB indication signals that the last run-level pair corresponding to a non-zero coefficient has been encoded. The inventors have determined that the proposed method, in which an explicit indication of the number of non-zero coefficients in a block is provided and coded using context-based arithmetic coding leads to an increase in the coding efficiency compared with the method of providing an EOB indication as currently employed in H.26L TML8.

Although the motivation behind the present invention and its basic concepts have been presented in the context of video encoding/decoding and more specifically with respect to H.26L TML8, it should be appreciated that invention may be applied in other video coding systems and also to still image coding. In principle the invention can be applied in any image coding system in which block-based transform coding and context-based arithmetic coding are used.

According to a first aspect of the present invention there is provided a method of image coding, wherein an image is divided in an encoder into a plurality of blocks having a plurality of pixels, each pixel having a pixel value, and a transform coding operation is performed on a block of pixel values to produce a corresponding block of transform coefficient values. The block of transform coefficient values is scanned in a given scanning order to produce a scanned array of coefficient values arranged according to the scanning order wherein the coefficient values in the scanned array are represented by a plurality of number pairs, each having a first number indicative of a non-zero coefficient value and a second number indicative of a number of consecutive zero coefficient values preceding the non-zero coefficient value, and wherein the first and the second number are each assigned to one of a plurality of contexts indicative of the number pairs. The method comprises the step of assigning a further value to a context based on a third number indicative of a preceding value.

Preferably, the further value is the first number in one of the number and the preceding value is the first number of a preceding number pair.

Preferably, the step of assigning the first number in one of the number pairs to a context based on a third number indicative of the first number of a preceding number pair further takes into account the context to which the first number of the number pair is assigned.

Advantageously, the first number is equal to the magnitude of a non-zero coefficient value.

Preferably, the contexts are contexts of a context-based arithmetic coder.

Even more preferably, the contexts are contexts of a context-based binary arithmetic coder.

Advantageously, each of the first, second and third numbers is mapped to a set of bins, each of the bins having an associated bin number and being capable of taking one of either a first value or a second value.

Preferably, each of the first, second and third numbers is mapped to one of the set of bins, mapping of a number to a given one of the set of bins being indicated by assigning the value of the bin to the first value.

Preferably the first value is 1 and the second value is 0.

Preferably each of the set of bins is assigned to a context.

Advantageously, the step of assigning the first number in one of the number pairs to a context based on a third number indicative of the first number of a preceding number pair further taking into account the context to which the first number in the preceding number pair is assigned is implemented by examining the bin number of the bin to which the first number of the preceding number pair is mapped.

Advantageously, the method further comprises maintaining a probability estimate describing the statistical properties of each context.

Preferably, for each context, the probability estimate is indicative of the statistical likelihood of a number having a predetermined value being assigned to the context.

Preferably, for each context, the probability estimate is maintained by keeping a record of occurrences of the first value and the second value in the bins assigned to the context in question.

According to a second aspect of the present invention there is provided a method of image coding, wherein an image is divided in an encoder into a plurality of blocks having a plurality of pixels, each pixel having a pixel value, and a transform coding operation is performed on a block of pixel values to produce a corresponding block of transform coefficient values. The block of transform coefficient values is scanned in a given scanning order to produce a scanned array of coefficient values arranged according to the scanning order wherein the coefficient values in the scanned array are represented by (converted into) a plurality of number pairs, each having a first number indicative of a non-zero coefficient value and a second number indicative of a number of consecutive zero coefficient values preceding the non-zero coefficient value, and wherein the first and the second number are each assigned to one of a plurality of contexts indicative of the number pairs. The method comprises the step of assigning the second number in one of the number pairs to a context based on the first number of the number pair.

Preferably, the step of assigning the second number in one of the number pairs to a context based on the first number of the number pair further takes into account the context to which the second number in the one of the number pairs is assigned.

Advantageously, the first number is equal to the magnitude of a non-zero coefficient value.

Preferably, the contexts are contexts of a context-based arithmetic coder.

Even more preferably, the contexts are contexts of a context-based binary arithmetic coder.

Advantageously, each of the first and second numbers is mapped to a set of bins, each of the bins having an associated bin number and being capable of taking one of either a first value or a second value.

Preferably, each of the first and second numbers is mapped to one of the set of bins, mapping of a number to a given one of the set of bins being indicated by assigning the value of the bin to the first value.

Preferably the first value is 1 and the second value is 0.

Preferably each of the set of bins is assigned to a context.

Advantageously, the step of assigning the second number in one of the number pairs to a context based on the first number of the number pair further taking into account the context to which the second number in the one of the number pairs is assigned is implemented by examining the bin number of the bin to which the second number is mapped.

Advantageously, the method further comprises maintaining a probability estimate describing the statistical properties of each context.

Preferably, for each context, the probability estimate is indicative of the statistical likelihood of a number having a predetermined value being assigned to the context.

Preferably, for each context, the probability estimate is maintained by keeping a record of occurrences of the first value and the second value in the bins assigned to the context in question.

Preferably, the methods according to the first and the second aspect of the invention are both applied to a block of transform coefficient values.

According to a third aspect of the present invention there is provided a system for image coding, wherein an image is divided in an encoder into a plurality of blocks having a plurality of pixels, each pixel having a pixel value, and a transform coding operation is performed on a block of pixels to produce a corresponding block of transform coefficient values. The block of transform coefficient values is scanned in a given scanning order to produce a scanned array of coefficient values arranged according to the scanning order wherein the coefficient values in the scanned array are represented by a plurality of number pairs, each having a first number indicative of a non-zero coefficient value and a second number indicative of a number of consecutive zero coefficient values preceding the non-zero coefficient value, and wherein the first and the second number are each assigned to one of a plurality of contexts indicative of the number pairs. The system comprises a mechanism, located in the encoder, for assigning the first number in one of the number pairs to a context based on a third number indicative of the first number of a preceding number pair.

According to a fourth aspect of the present invention there is provided a system for image coding, wherein an image is divided in an encoder into a plurality of blocks having a plurality of pixels, each pixel having a pixel value, and a transform coding operation is performed on a block of pixels to produce a corresponding block of transform coefficient values. The block of transform coefficient values is scanned in a given scanning order to produce a scanned array of coefficient values arranged according to the scanning order wherein the coefficient values in the scanned array are represented by a plurality of number pairs, each having a first number indicative of a non-zero coefficient value and a second number indicative of a number of consecutive zero coefficient values preceding the non-zero coefficient value, and wherein the first and the second number are each assigned to one of a plurality of contexts indicative of the number pairs. The system comprises a mechanism, located in the encoder, for assigning the second number in one of the number pairs to a context based on the first number of the number pair.

According to a fifth aspect of the present invention there is provided a method of image coding, wherein an image is divided in an encoder into a plurality of blocks having a plurality of pixels, each pixel having a pixel value, and a transform coding operation is performed on a block of pixels to produce a corresponding block of transform coefficient values. The method comprises the step of providing a number indicative of the number of non-zero coefficient values in the block of transform coefficient values and assigning the number to a context.

Advantageously, the step of assigning the number indicative of the number of non-zero transform coefficient values in the block of transform coefficient values takes into account the context to which another such number indicative of the number of non-zero transform coefficient values in another block of transform coefficient is assigned.

Advantageously, the block of transform values is scanned in a given scanning order to produce a scanned array of coefficient values arranged according to the scanning order wherein the coefficient values in the scanned array are represented by a plurality of number pairs, each having a first number indicative of a non-zero coefficient value and a second number indicative of the number of consecutive zero coefficient values preceding the non-zero coefficient value.

Preferably, an end-of-block indication, indicative of the last non-zero coefficient value in the scanned array of coefficient values is not provided.

Preferably, the first number is equal to the magnitude of a non-zero coefficient value minus 1.

Preferably, the methods according to the first, second and fifth aspects of the invention are each applied to a block of transform coefficient values.

According to a sixth aspect of the present invention there is provided a system for image coding, wherein an image is divided in an encoder into a plurality of blocks having a plurality of pixels, each pixel having a pixel value, and a transform coding operation is performed on each block of pixels to produce a corresponding block of transform coefficient values. The system comprises a mechanism, located in the encoder and responsive to the coefficient values, for providing a third number indicative of the number of non-zero coefficient values in the block of transform coefficient values and assigning the number to a context.

Advantageously, the system further comprises a mechanism for assigning the number indicative of the number of non-zero transform coefficient values in the block of transform coefficient values taking into account the context to which another such number indicative of the number of non-zero transform coefficient values in another block of transform coefficient is assigned.

According to a seventh aspect of the present invention there is provided a computer program comprising code for performing a method of image coding, in which an image is divided into a plurality of blocks having a plurality of pixels, each pixel having a pixel value, and a transform coding operation is performed on a block of pixel values to produce a corresponding block of transform coefficient values. The computer program also comprises code for scanning the block of transform coefficient values in a given scanning order to produce a scanned array of coefficient values arranged according to the scanning order wherein the coefficient values in the scanned array are represented by a plurality of number pairs, each having a first number indicative of a non-zero coefficient value and a second number indicative of a number of consecutive zero coefficient values preceding the non-zero coefficient value, and wherein the first and the second number are each assigned to one of a plurality of contexts indicative of the number pairs. The computer program also comprises code for assigning the first number in one of the number pairs to a context based on a third number indicative of the first number of a preceding number pair.

According to an eighth aspect of the present invention there is provided a computer program comprising code for performing a method of image coding, wherein an image is divided in an encoder into a plurality of blocks having a plurality of pixels, each pixel having a pixel value, and a transform coding operation is performed on a block of pixel values to produce a corresponding block of transform coefficient values. The computer program also comprises code for scanning the block of transform coefficient values in a given scanning order to produce a scanned array of coefficient values arranged according to the scanning order wherein the coefficient values in the scanned array are represented by a plurality of number pairs, each having a first number indicative of a non-zero coefficient value and a second number indicative of a number of consecutive zero coefficient values preceding the non-zero coefficient value, and wherein the first and the second number are each assigned to one of a plurality of contexts indicative of the number pairs. The computer program further comprises code for assigning the second number in one of the number pairs to a context based on the first number of the number pair.

According to a ninth aspect of the present invention there is provided a computer program comprising code for performing a method of image coding, wherein an image is divided in an encoder into a plurality of blocks having a plurality of pixels, each pixel having a pixel value, and a transform coding operation is performed on a block of pixels to produce a corresponding block of transform coefficient values. The computer program further comprises code for providing a number indicative of the number of non-zero coefficient values in the block of transform coefficient values and assigning the number to a context.

Advantageously, the computer program further comprises code for assigning the number indicative of the number of non-zero transform coefficient values in the block of transform coefficient values taking into account the context to which another such number indicative of the number of non-zero transform coefficient values in another block of transform coefficient is assigned.

According to a tenth aspect of the invention there is provided a computer program according to the seventh, eighth and ninth aspects of the invention.

The present invention will become apparent upon reading the description taken in conjunction with FIGS. 7a to 12.

BRIEF DESCRIPTION OF THE DRAWINGS

FIG. 6a is a diagrammatic representation showing an exemplary two-dimensional array of quantized DCT coefficient values scanned in a zigzag manner.

FIG. 6b is a table showing the level and run values derived from the array of FIG. 6a.

FIG. 6c is a table showing the binarized level and run values resulted from the application of the binarization scheme of Table 1 to the level and run values of FIG. 6b.

FIG. 6d is a table showing a way in which the probability estimates are updated from runs and levels.

FIG. 7b is a table showing the way in which contexts are assigned to level values according to the first embodiment of the present invention.

FIG. 8a is a table showing a way in which contexts are assigned to bins based on run values.

BEST MODE TO CARRY OUT THE INVENTION

Figure 1:
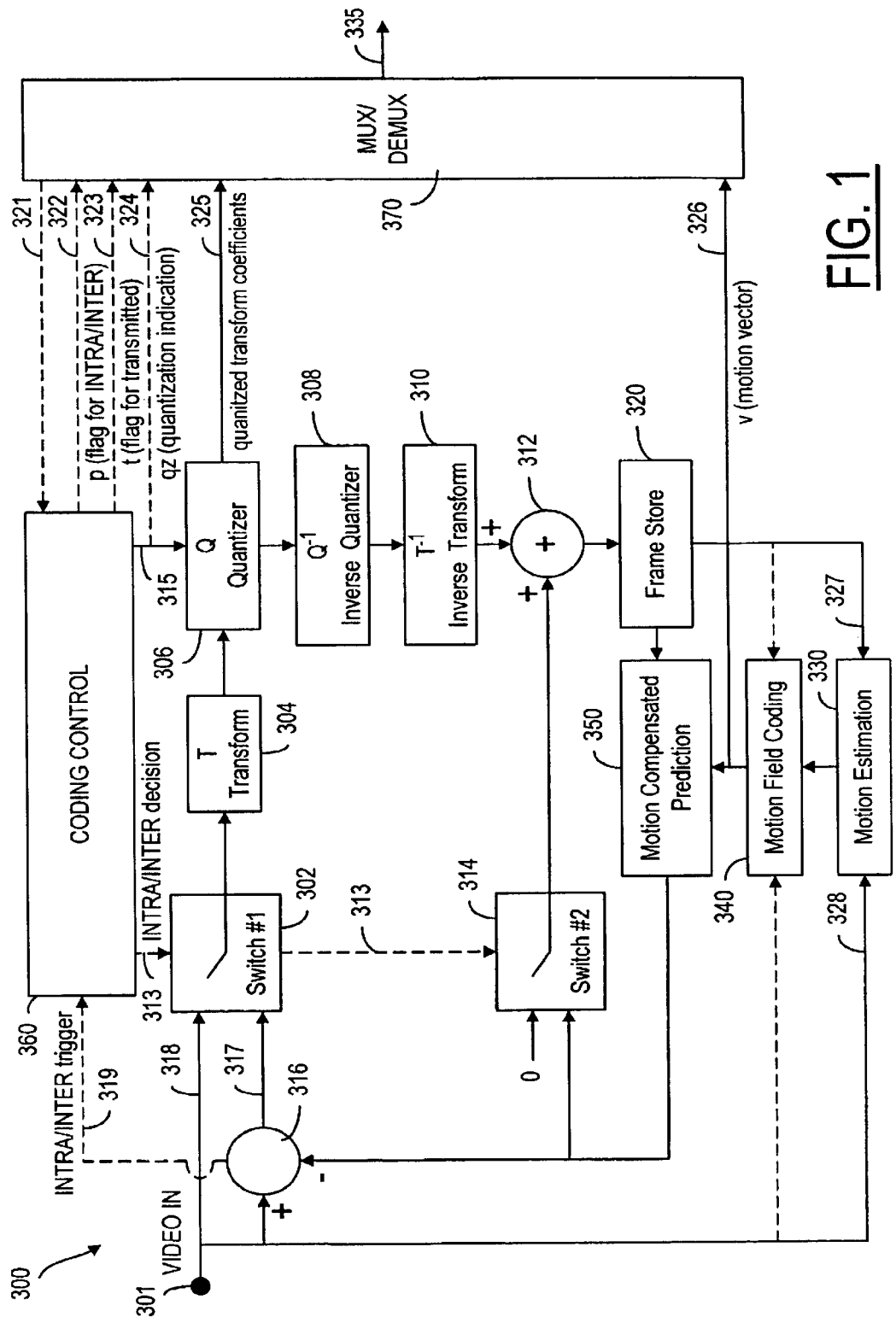
FIG. 1 is a block diagram illustrating the structure of an exemplary video encoder, which employs block-based transform coding and motion-compensated prediction.
Figure 2:
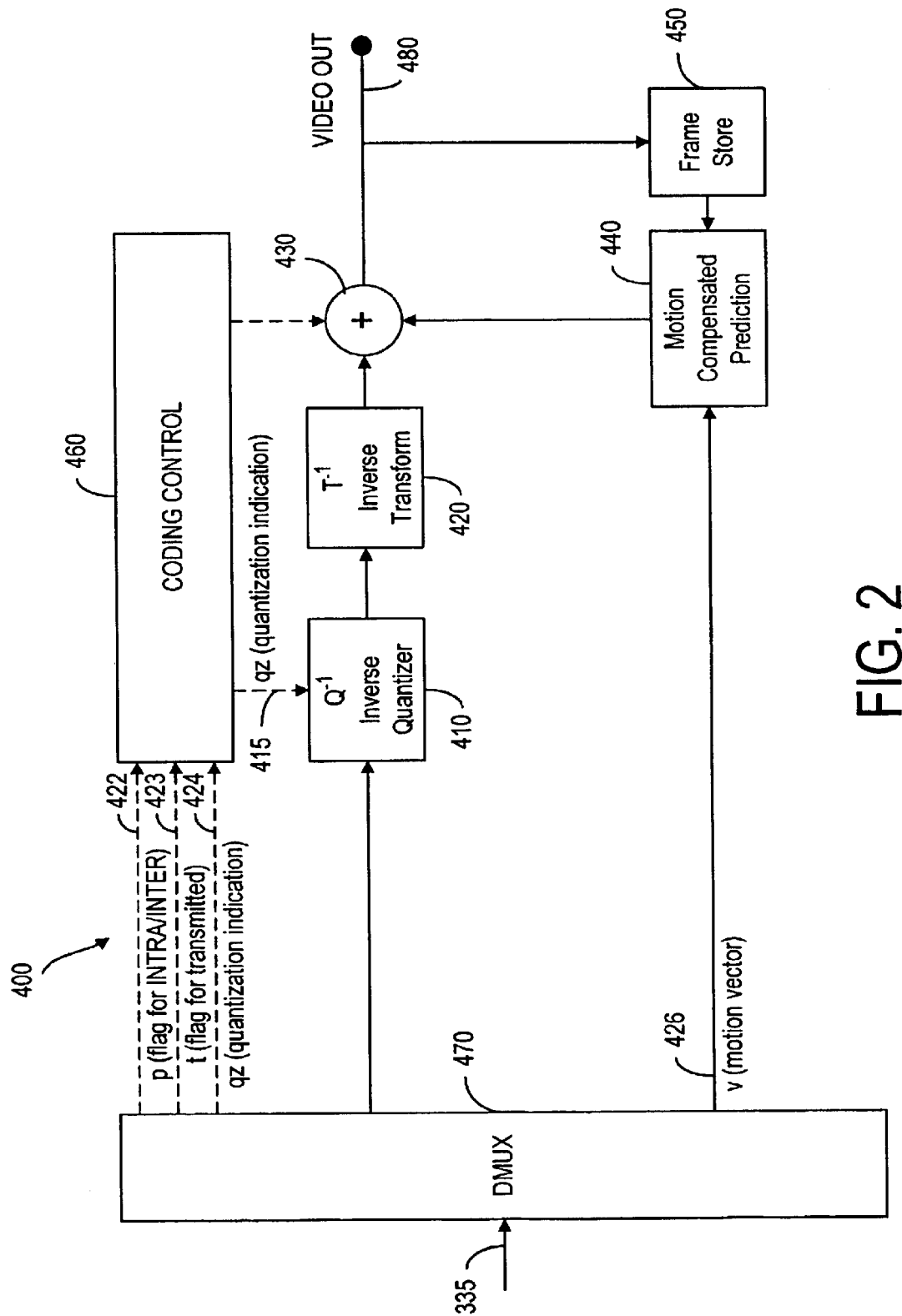
FIG. 2 is a block diagram of an exemplary video decoder corresponding to the encoder of FIG. 1.
Figure 3:
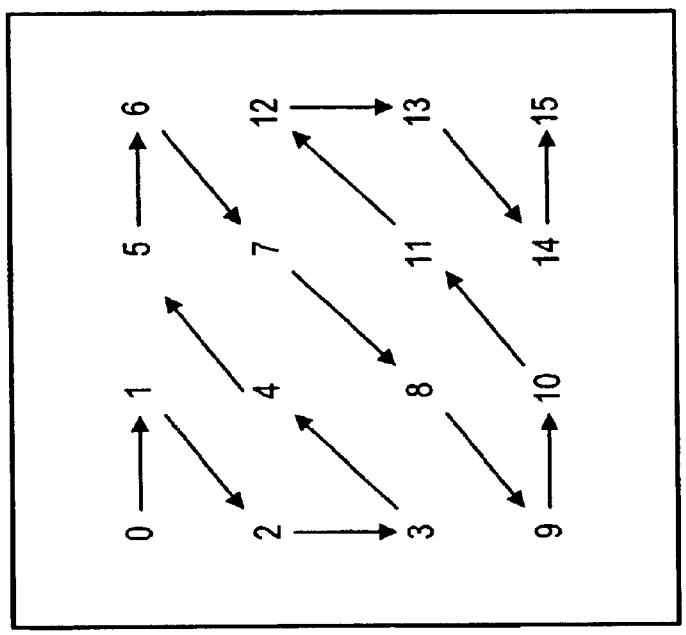
FIG. 3 is a diagrammatic representation showing an exemplary zig-zag scan.
Figure 4:
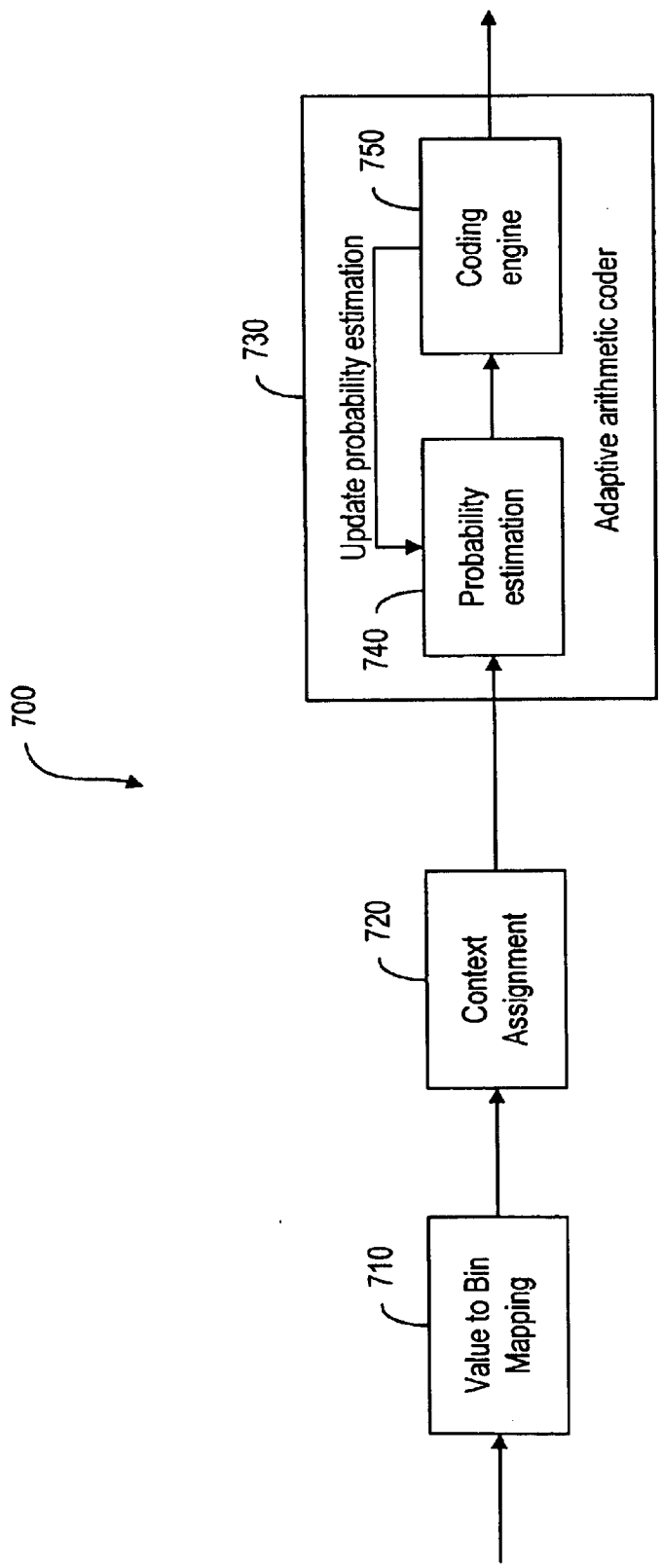
FIG. 4 is a block diagram showing an encoder in a prior art context-based arithmetic coding scheme.
Figure 5:
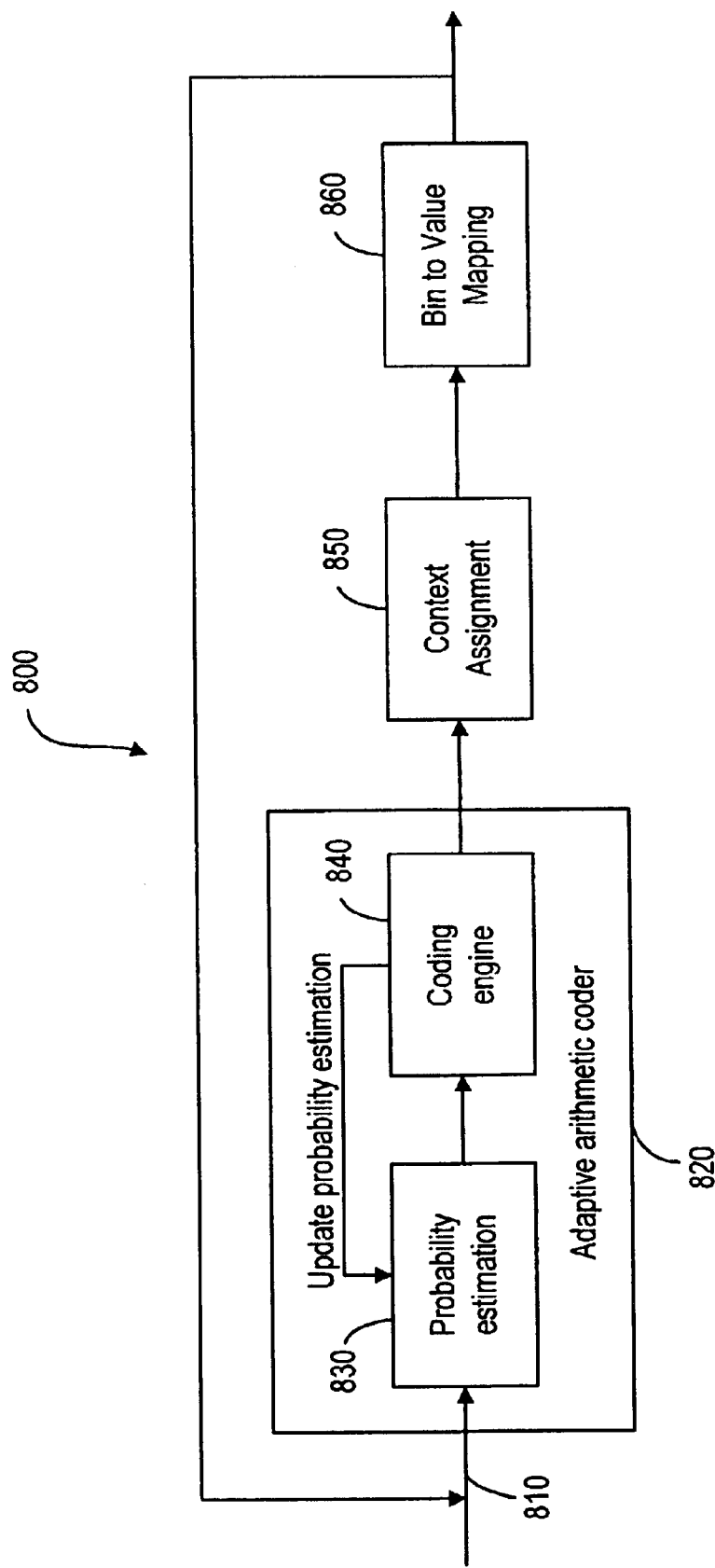
FIG. 5 is a block diagram showing a decoder in a prior art context-based arithmetic coding scheme.
Figures 6A, 6B:
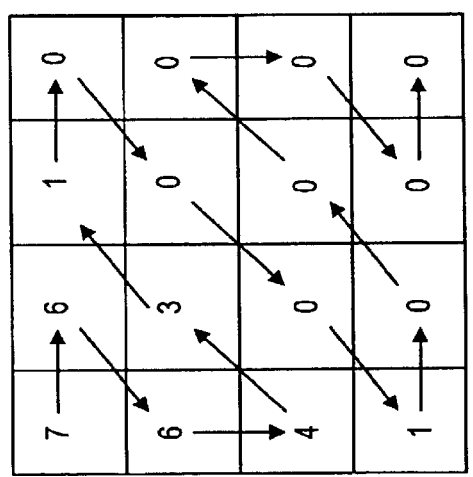

Embodiments of the invention will now be discussed in detail. As described above, the present invention provides a number of related mechanisms by which an improvement in the coding efficiency (data compression) of a context-based arithmetic coder, can be attained. This improvement is achieved by using context models, which take into account the contexts to which other data symbols are assigned.

The first embodiment of the invention, described in detail in section 1.1 below, relates to a context-based binary arithmetic coder suitable for use in an image coding system such as that defined by ITU-T recommendation H.26L. In this embodiment, level values generated by run-level coding the quantized transform coefficients of a transform coded block of image pixels are assigned to contexts taking into account the level of another transform coefficient belonging to the same block.

The second embodiment of the invention, described in detail in section 1.2, also relates to a context-based binary arithmetic coder for an image coding system such as that defined by ITU-T recommendation H.26L. In the second embodiment, run values produced by run-level coding the quantized DCT transform coefficients of a transform coded block of image pixels are assigned to contexts taking into account the level value of the run-level pair to which the run value belongs.

The third embodiment of the invention is described in section 1.3 and also relates to a context-based arithmetic coder for an image coding system such as that defined by ITU-T recommendation H.26L. According to the third embodiment, the number of non-zero transform coefficients $N_c$ for a transform coded image block is determined and assigned to a context taking into account the context assigned to the $N_c$ value for at least one other transform coded image block.

A preferred embodiment of the invention combines the functionality of the three above-mentioned embodiments.

As explained earlier in the text, the high complexity profile of ITU-T recommendation H.26L TML8 employs a form of context-based arithmetic coding known as CABAC. In a video encoder implemented according to H.26L, the CABAC method is used to encode a variety of different types of information produced by the encoder, including the transform coefficients generated by transform coding blocks of image pixels (in INTRA-coding mode) or prediction error values (in INTER-coding mode). The two-dimensional array of transform coefficients produced by transform coding a block of image pixels is scanned according to a particular scanning mode to produce a one-dimensional array. Two such scanning modes are defined in H.26L. The first is known as 'single-scanning mode' while the other is referred to as 'double-scanning mode'. Whichever scanning mode is used, scanning of the transform coefficients converts the two-dimensional array of coefficient values into a one-dimensional array in which the coefficients are ordered in a predetermined manner. The ordered transform coefficient values in the one-dimensional array are converted run and level values. The last entry in the ordered one-dimensional array is an end-of-block symbol, which according to H.26L TML8, takes the form of a level value equal to zero. This indicates that the last non-zero coefficient value in the ordered array has been converted into a run-level pair.

The run and level values are converted to binary numbers (binarized), by mapping them to a series of bins, each of which can be assigned the value 0 or 1 (see Table 1). The binarized run and level values are then assigned to contexts, a separate set of contexts being defined for the runs and the levels. According to H.26L TML8, for a given block type, the set of contexts defined for levels depends only on the bin number to which the levels are assigned. More specifically, according to H.26L TML8 four contexts are defined for level encoding. The first one is for the first bin, the second is for the second bin, while the third context is for the rest of the bins representing the magnitude of the level. The remaining context is used for the sign of the level. For runs there are three contexts, the first one for the first bin, the second for the second bin and the third for all remaining bins. As run values are always equal to or greater than zero, there is no need for an additional context to represent sign information.

1.1. Context Model for Levels

According to the first embodiment of the present invention, when assigning a binarized level value to a context, in addition to considering the bin to which the level value itself is mapped, the level value of the preceding run-level pair is also taken into account. In this context, the term 'preceding run-level pair' means the run-level pair corresponding to the preceding coefficient in the ordered one-dimensional array of coefficient values. The following pseudo code presents an exemplary procedure for assigning a context to a level value of a run-level pair, taking into account both the bin to which the level itself is mapped and the level value of the preceding run-level pair:

```
if (bin_nr > MAX_BIN_LEVEL)
    bin_nr = MAX_BIN_LEVEL;
end
if(prev_level > MAX_LEVEL)                                    (2)
    prev_level = MAX_LEVEL;
end
context = (bin_nr-1)*MAX_LEVEL + prev_level
```

Figure 7A:
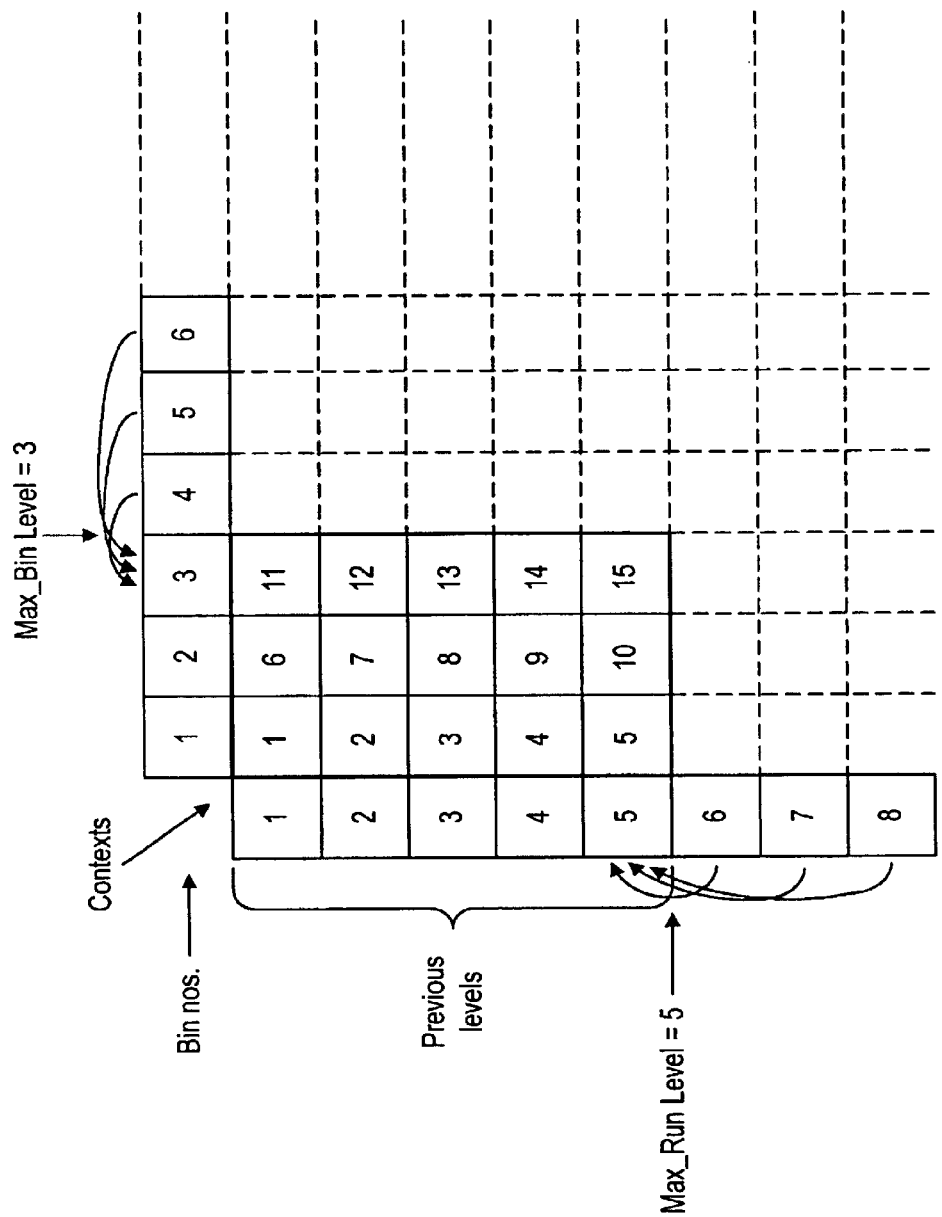
FIG. 7a is a table showing a way in which contexts are assigned to bins based on level values.

In expression (2) prev_level is the (magnitude of the) level value of the previous run-level pair. prev_level is initialized to zero at the beginning of each block. In a double scanning mode, prev_level is initialized at the beginning of each scan, twice per block. Parameter MAX_BIN_LEVEL provides a means of controlling the way in which the bin number to which the level value is mapped affects the assignment of a context. More specifically, and in a manner similar to the present assignment of contexts according to H.26L TML8, MAX_BIN_LEVEL effectively defines a context to which all bin numbers greater than or equal to MAX_BIN_LEVEL are assigned. In an similar fashion parameter MAX_LEVEL provides a means of controlling the way in which the level value of the previous run-level pair affects the assignment of a context. FIGS. 7a and 7b illustrate the way in which contexts are assigned to level values according to the first embodiment of the invention by applying the pseudo code of expression (2) with MAX_BIN_LEVEL=3 and MAX_LEVEL=5. In principle, any combination of MAX_BIN_LEVEL and MAX_LEVEL can be used to define a set of contexts appropriate for the statistical characteristics of the level values to be coded.

1.2. Context Model for Runs

According to the second embodiment of the invention an approach is similar to that described in section 1.1 is used to assign run values to contexts. More specifically, when assigning a binarized run value to a context, in addition to considering the bin to which the run value itself is mapped, the level of the run-level pair to which the run value belongs is also taken into account. The following pseudo code presents an exemplary procedure for assigning a context to a run value of a run-level pair, taking into account both the bin to which the run itself is mapped and the level value of the run-level pair to which the run value belongs:

```
if (bin_nr > MAX_BIN_RUN)
    bin_nr = MAX_BIN_RUN;
end
if (level > MAX_RUNL)                                         (3)
    level = MAX_RUNL;
end
context = (bin_nr-1)*MAX_RUNL + level
```

Figure 8B:
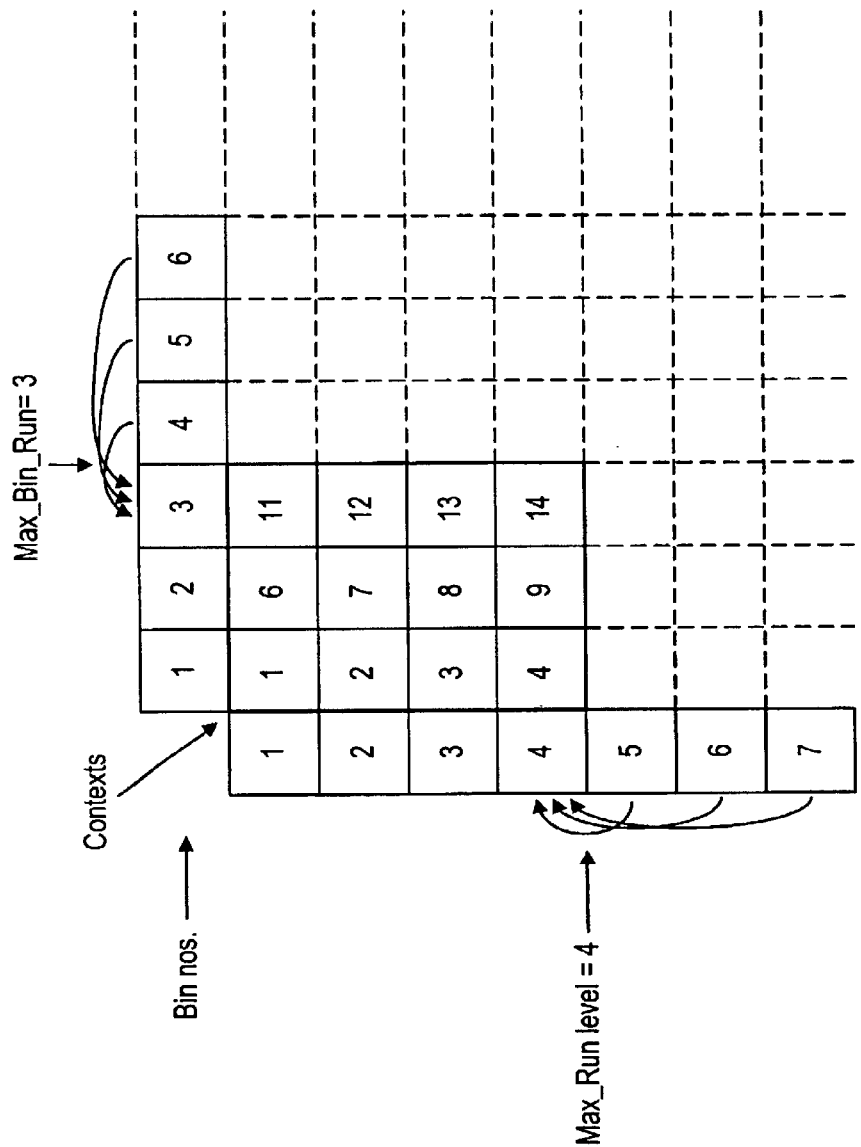
FIG. 8b is a table showing the way in which contexts are assigned to run values according to the second embodiment of the present invention.

In expression (3) level is the magnitude of the level value of the run-level pair. Parameter MAX_BIN_RUN provides a means of controlling the way in which the bin number to which the run value is mapped affects the assignment of a context. More specifically, and in a manner similar to the present assignment of contexts according to H.26L TML8, MAX_BIN_RUN effectively defines a context to which all bin numbers greater than or equal to MAX_BIN_RUN are assigned. In an similar fashion parameter MAX_RUNL provides a means of controlling the way in which the level value of run-level pair affects the assignment of a context. FIGS. 8a and 8b illustrates the way in which contexts are assigned to level values according to the second embodiment of the invention by applying the pseudo code of expression (3) with MAX_BIN_RUN=3 and MAX_RUNL=4. In principle, any combination of MAX_BIN_RUN and MAX_RUNL can be used to define a set of contexts appropriate for the statistical characteristics of the run values to be coded.

1.3 Contexts for Number of Non-Zero Coefficients

The third embodiment of the invention relates in particular to the way in which an ordered array of transform coefficient values is converted into run and level values and the way in which the number of run-level pairs corresponding to an array of quantized transform coefficient values is signaled. More specifically, after a block of image pixels or prediction error values has been transform coded to form a two-dimensional array of transform coefficient values and each of the coefficient values has been quantized, the number of non-zero quantized coefficient values in the array is determined. A value, referred to as $N_c$, is assigned to that number and is used to signal explicitly the number of non-zero coefficient values in the array. Thus, according to this embodiment of the invention, an EOB symbol, for example a level value equal to zero, is no longer required.

The quantized transform coefficients are further scanned according to a predetermined scanning order to produce an ordered one-dimensional array. Alternatively, $N_c$ may be determined after ordering the quantized coefficient values. Each of the non-zero quantized coefficients in the ordered array is then converted into a run-level pair. According to this embodiment of the invention, the level value of the run-level pair denotes the magnitude of the value of the quantized coefficient minus 1 and the run value corresponds to the number of consecutive zero-valued quantized coefficients preceding the coefficient in question. The level values are assigned to the magnitude of the value of the quantized coefficient minus 1 because a level value equal to zero is no longer used as an end-of-block indicator. This gives rise to a saving in the amount of data (e.g. number of bits) required to represent the level information.

The level and run values are then encoded using entropy coding, as is the $N_c$ value. In a situation where a context-based arithmetic coding method such as the CABAC technique implemented in H.26L TML8 is used, the run and level values may be encoded according to the first and/or second embodiments of the invention, as described above. Alternatively any other appropriate context models may be used for the run and level values. Additionally a separate context model is defined for $N_c$. According to this embodiment of the invention, the $N_c$ value representing the number of non-zero quantized transform coefficients in a given block is first binarized by mapping it to a series of bins, each of which has a corresponding bin number. The context for $N_c$ is then determined on the basis of the bin number to which $N_c$ is mapped and the $N_c$ of at least one other image block or macroblock which has already been assigned an $N_c$ value. The following pseudo code presents an exemplary procedure for assigning a context to an $N_c$ value, taking into account both the bin to which the $N_c$ itself is mapped and the preceding $N_c$ value:

```
if (bin_nr > MAX_BIN_Nc)
    bin_nr = MAX_BIN_Nc;
end
if(prev_nc > MAX_Nc)                                    (4)
    prev_nc = MAX_Nc;
end
context = (bin_nr-1)*MAX_nc + prev_nc
```

In expression (4) prev_nc is the previous $N_c$ value.

When encoded level and run values for a given block of quantized transform coefficents are transmitted from an encoder to a decoder, the entropy coded $N_c$ value is transmitted before the encoded run and level values. At the decoder, the $N_c$ value is decoded, followed by the run-level pairs corresponding to the quantized transform coefficient values for the block in question. The value of +1 is added to each of the magnitude of the level values as they are decoded in order to compensate for the corresponding subtraction made at the encoder.

To demonstrate the improvement in coding efficiency using the method of image coding, according to the present invention, the average bitrate difference is calculated using results from QP=28, 24, 20, 16. Table 2 shows the bitrate reduction in percentage, as compared to TML-8, where MAX_LEVEL=5 and MAX_RUN=4. All frames are encoded as I-frames in CABAC mode. As shown in Table 2, the reduction in bitrate ranges from 0.95 to 4.74%. The improvement is more pronounced when the QP values are small.

TABLE 2

| QP | Container | Foreman | News | Silent | Tempete | Mobile | Paris |
|---|---|---|---|---|---|---|---|
| 5 | 3.19 | 3.92 | 3.11 | 4.74 | 4.01 | 3.63 | 3.34 |
| 10 | 3.10 | 3.39 | 2.85 | 4.32 | 3.88 | 3.73 | 3.04 |
| 16 | 2.64 | 2.67 | 2.26 | 3.17 | 3.37 | 3.37 | 2.55 |
| 20 | 2.20 | 2.14 | 1.76 | 2.38 | 2.79 | 2.90 | 2.20 |
| 24 | 1.30 | 1.51 | 1.35 | 2.28 | 1.89 | 2.01 | 1.54 |
| 28 | 1.16 | 0.95 | 0.99 | 1.76 | 1.55 | 1.57 | 1.18 |
| Ave. Bitrate Diff.* (%) | 1.79 | 1.83 | 1.58 | 2.37 | 2.49 | 2.40 | 1.87 |

In Tables 2, the names appearing on the first row of the table are pictures used in Gisle Bjontegaard "Recommended Simulation Conditions for H.26L" (VCG-M75, ITU-T Video Coding Experts Group, Austin, Tex., USA, 2–4, Apr., 2001).

Figure 9:
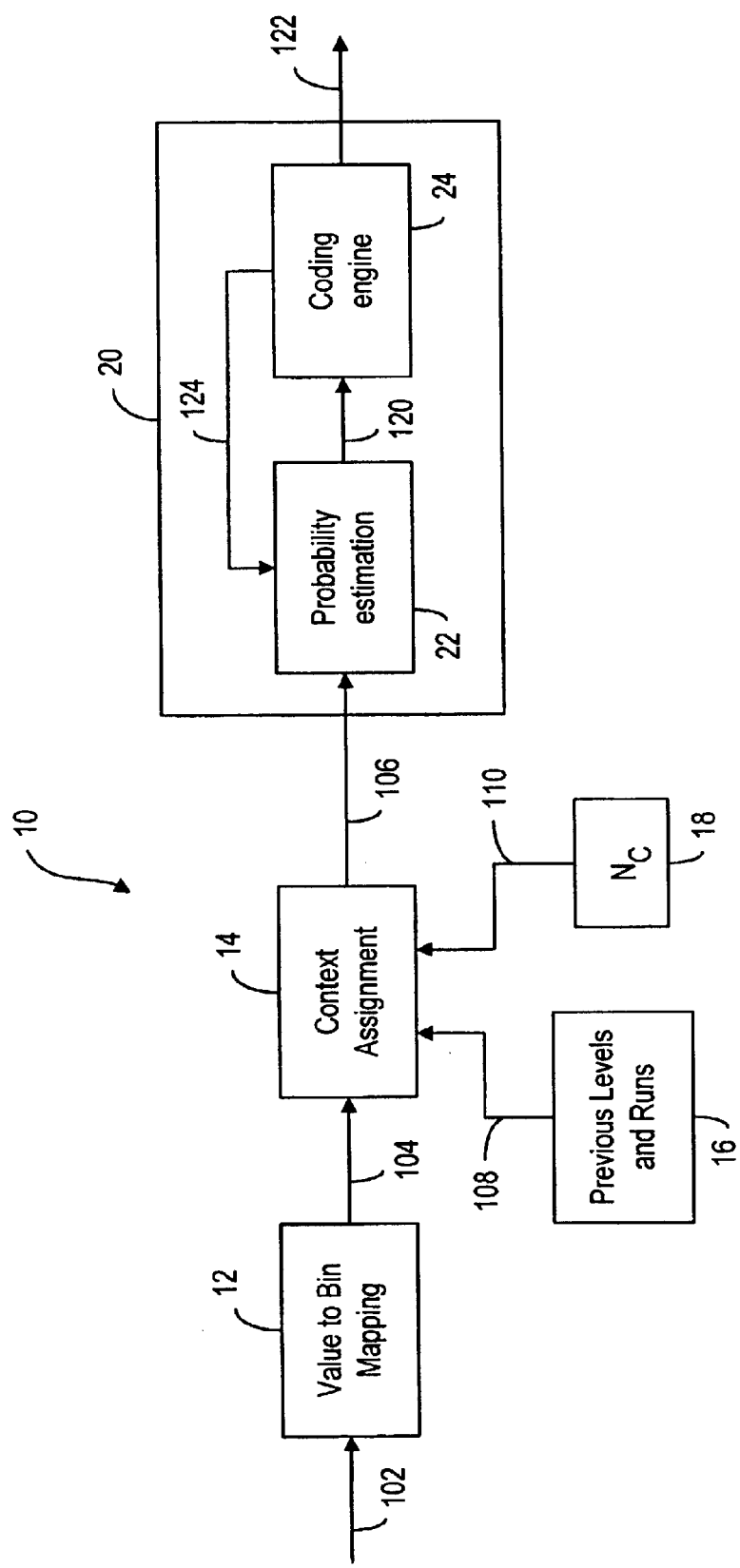
FIG. 9 is a block diagram illustrating an encoder in a context-based arithmetic coding scheme, according to the present invention.

Referring now to FIG. 9, an encoder 10 in the transmit side, according to the present invention, includes a unit 16 for storing previous levels and runs. As shown in FIG. 9, the run-level pairs 102 for a given block are provided to a mapping unit 12, which map the pairs to a sequence of bins, each bin having a value of 0 or 1. The location of the bin in the sequence representing a run-level pair is called a bin number. The bin numbers are represented by signals 104. Based on the signals 104 and a previously encoded level value 108 provided by unit 16, an assignment unit 14 assigns a context to a bin number. The contexts, denoted by signals 106, are provided to an adaptive arithmetic coder 20. The probability of occurrence of 1 and the probability of occurrence of 0 are estimated by a probability estimation module 22. Based on the probability estimates 120, an arithmetic encoding unit 24 encodes the bins. A feedback signal 124 is provided from the encoder 24 to the probability estimation module 22 to update the probability estimation. The encoded information is made into a bit-stream 122 to be conveyed to a decoder or stored in a storage device for later use.

Preferably, the encoder 10 also includes a unit 18, which is capable of providing the number, $N_c$, of non-zero coefficients in the block to the arithmetic encoder 20 before the run-level pairs are provided to the arithmetic encoder 20, so that $N_c$ is also encoded and included into the bit-stream 122. $N_c$ is represented by signals 110. By using $N_c$, there is no need to send an End-of-Block (EOB) symbol to the decoder. In prior art, the level value of 0 is used for the EOB symbol. More specifically, $N_c$ is found after transform and quantization and it is encoded with entropy encoding. It should be noted that with the number of non-zero coefficients known, it is no longer necessary to use the 0-level value to signal the end of the block. Thus, it is possible to modify the level value by subtracting the value of the quantized coefficient by 1.

Figure 10:
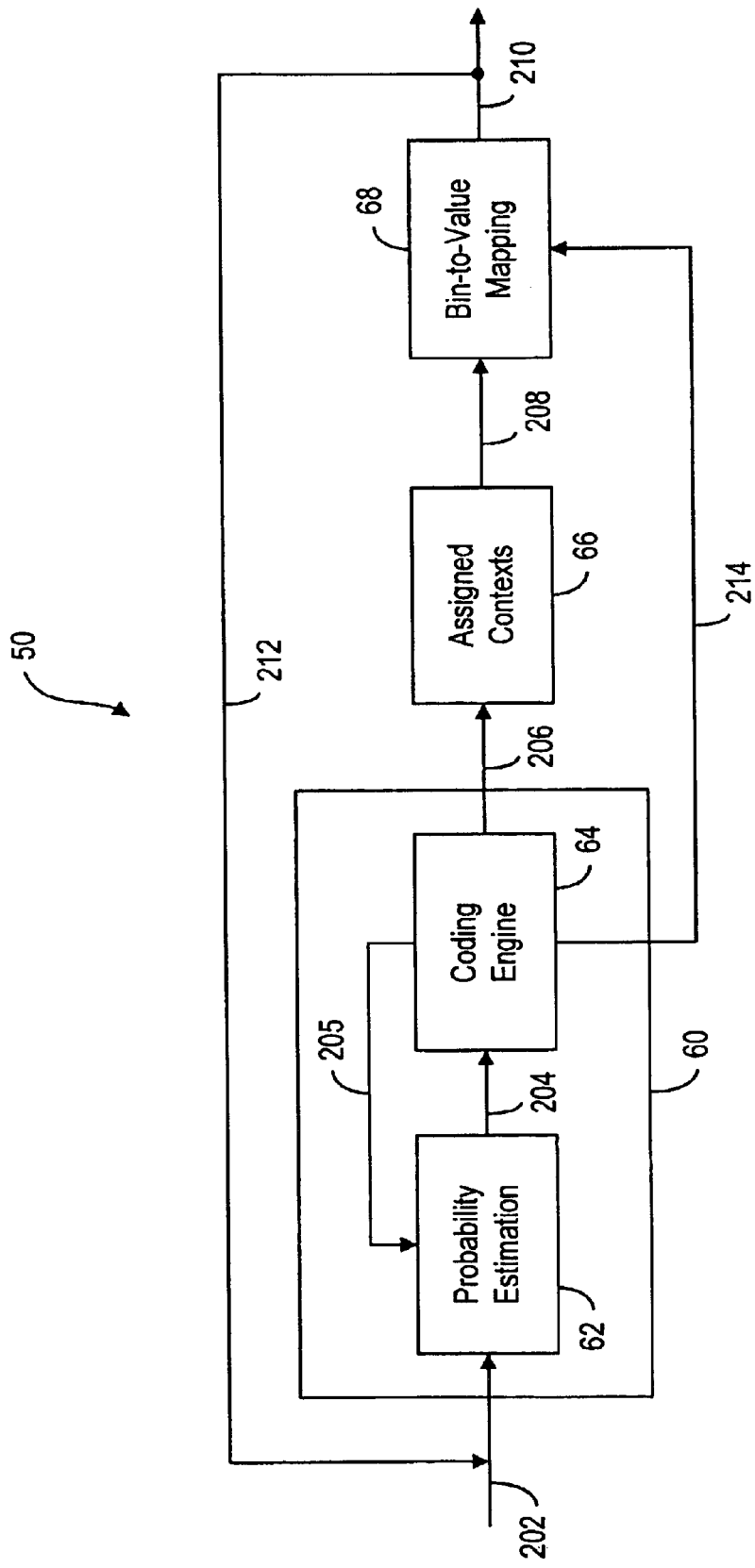
FIG. 10 is a block diagram illustrating a decoder, according to the present invention.

On the receive side, as shown in FIG. 10, a decoder 50 is used to receive the bit-stream 122 provided by the encoder 10. The received bit-stream, which represents arithmetic coded data symbols, is denoted by reference numeral 202. Initially, based on the previously decoded symbols, a context is calculated in a context assignment block 66 and the probability estimates of the bin values are updated in a probability estimation block 62. The previously decoded symbols based on which the probability estimates are updated are denoted by reference numeral 205. Context assignment, as carried out in the context assignment block 66, and calculation of probability estimates, as carried out in the probability estimation block 62, are similar to those in the encoder 10. The received bits 202 are then fed into an arithmetic decoding engine 64 in an arithmetic coder 60, where they are converted into decoded bin values 206, using the calculated context and the current probability estimates of the bin values 204. Decoded bins 208 are mapped to the values of the runs and levels in block 68. If the number, $N_c$, of non-zero coefficients in the block is encoded in the encoder 10 and provided in the received bit-stream 202, then a signal 214 is provided to the bin-to-value mapping module 68 whereby the quantized coefficient is restored by adding to the level value by 1.

Figure 11:
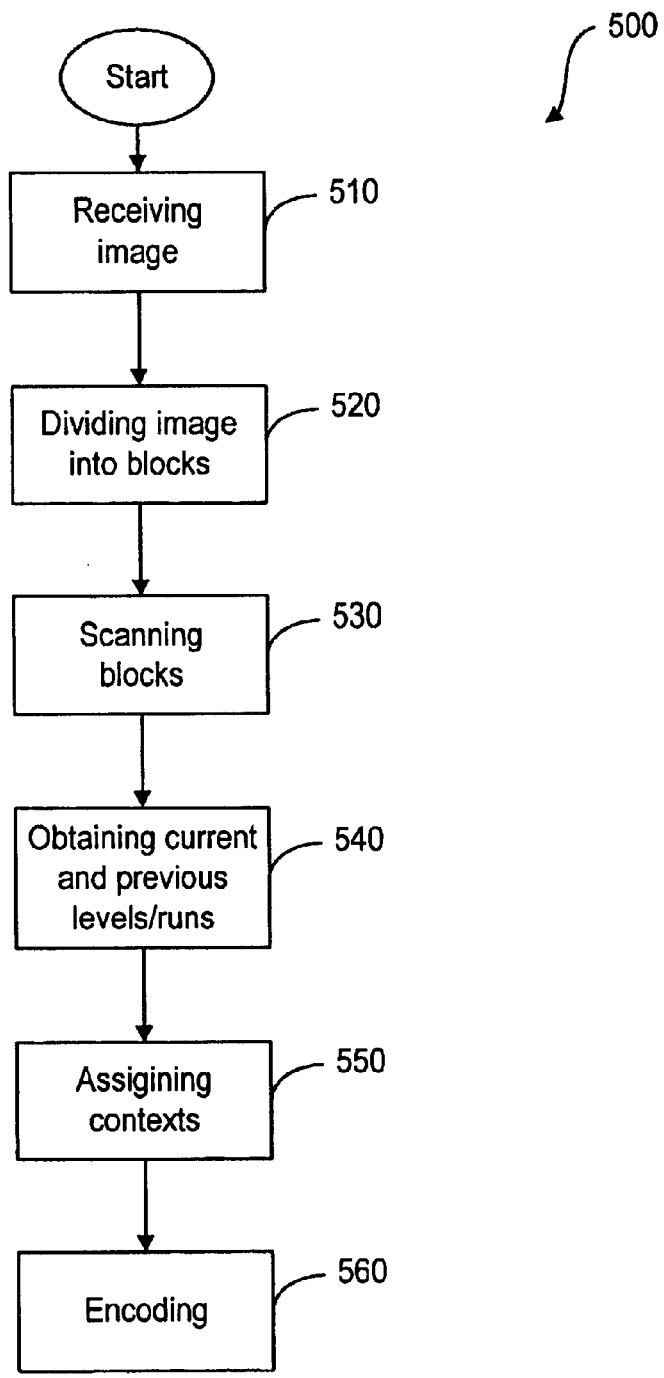
FIG. 11 is a flowchart illustrating a method of image coding, according to the preferred embodiment of the present invention.

FIG. 11 is a flowchart illustrating a method of image coding, according to the preferred embodiment of the present invention. As shown, the method 500 starts at step 510 where an image is received by an encoder. The received image is divided into a plurality of blocks at step 520. Each block is scanned at step 530 and the levels and runs of the quantized coefficients in the block are obtained at step 540. In contrast to prior art coding schemes, the present invention also uses the previous levels in the assignment of contexts at step 550. In particular, the assignment of contexts to the bins representing the level values of the quantized coefficients takes into account the value of the previously encoded level, as described in section 1.1. Likewise, the assignment of contexts to the bins representing the run values of the quantized coefficients takes into account the level value, as described in section 1.2. The assigned contexts are conveyed to an arithmetic coder for encoding at step 560. Additionally, $N_c$, or the number of non-zero quantized coefficients, is determined during or after the block is scanned at step 530 and $N_c$ is encoded at step 560 prior to $N_c$ and the contexts being provided to a decoder, as described in section 1.3.

Figure 12:
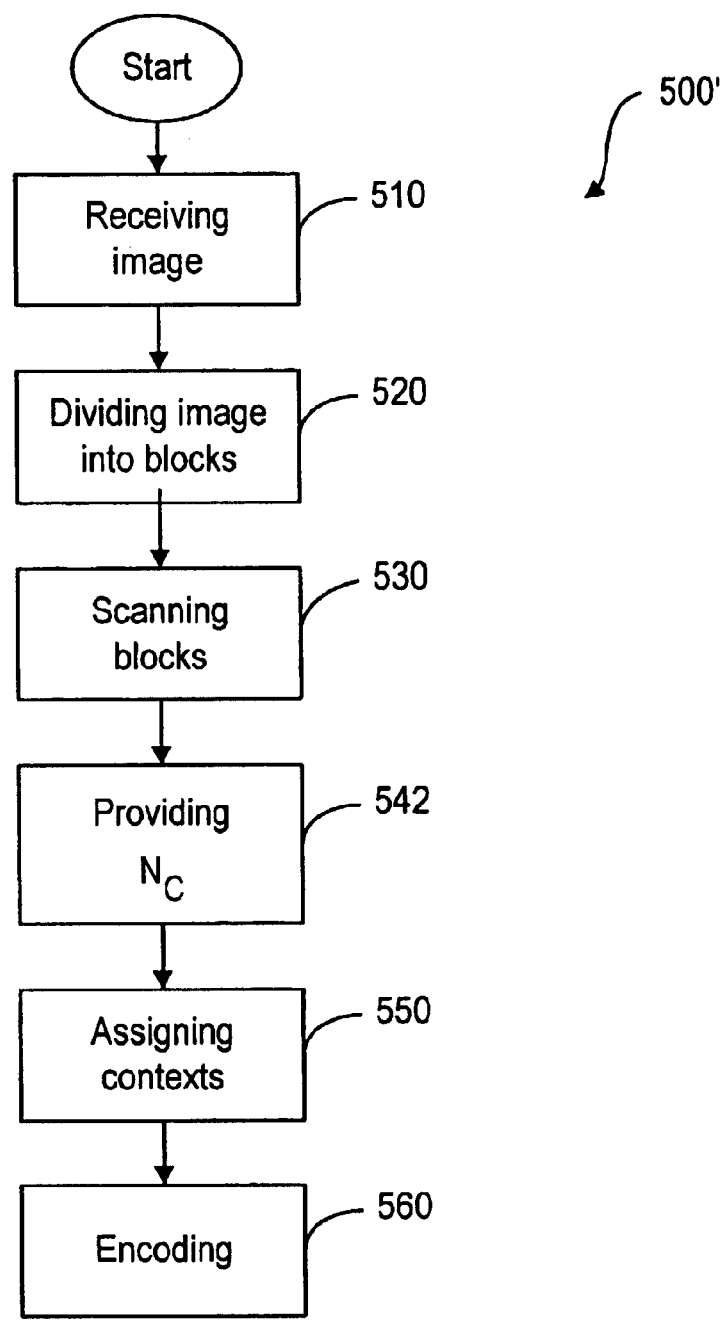
FIG. 12 is a flowchart illustrating a method of image coding, according to another embodiment of the present invention.

Alternatively, the image coding method can be improved solely by conveying signals indicative of $N_c$ to the receive side, without considering the value of the previously encoded level or run when the contexts are assigned, as shown in FIG. 11. As shown in FIG. 12, instead of obtaining the previously encoded levels and runs at step 540 for assigning the contexts at step 550, $N_c$ is obtained and provided at step 542. $N_c$ is conveyed, before the contexts assigned at step 550 are sent, to an arithmetic coder for encoding at step 560. By sending $N_c$, there is no need to send the EOB symbol to the decoder.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of image coding, wherein an image is divided in an encoder into a plurality of blocks having a plurality of pixels, each pixel having a pixel value, and a transform coding operation is performed on a block of pixels to produce a corresponding block of transform coefficient values, the block of transform coefficient values being scanned in a given scanning order to produce a scanned array of coefficient values arranged according to the scanning order, the method comprising the steps of:
   representing the coefficient values in the scanned array by a plurality of number pairs, each of said number pairs having a first number and a second number; and
   assigning the first numbers to one of a plurality of contexts representative of the first numbers such that the first number of a first number pair is assigned to a context at least partly in dependence on a first number of a second number pair.

2. A method according to claim 1, wherein the first number of the first number pair is assigned to a context at least partly in dependence on the first number of a preceding number pair in the scanning order.

3. A method according to claim 1, wherein said plurality of contexts are contexts of a context-based arithmetic coder.

4. A method according to claim 1, wherein said plurality of contexts are contexts of a context-based binary arithmetic coder.

5. A method according to claim 4, further comprising the step of:
   mapping the first numbers of said number pairs to a set of bins, each of which can be assigned one of either a first or a second value.

6. A method according to claim 5, wherein mapping of a number to a given one of said set of bins is indicated by assigning the bin to the first value.

7. A method according to claim 5, wherein the first value is 1 and the second value is 0.

8. A method according to claim 5, wherein the first number of a number pairs is assigned to a context at least partly in dependence on the bin to which the first number of said number pair is mapped.

9. A method according to claim 1, wherein said first number is indicative of a non-zero coefficient value and said second number is indicative of a number of consecutive zero coefficient values preceding said non-zero coefficient value.

10. A method of image coding, wherein an image is divided in an encoder into a plurality of blocks having a plurality of pixels, each pixel having a pixel value, and a transform coding operation is performed on a block of pixels to produce a corresponding block of transform coefficient values, the block of transform coefficient values is scanned in a given scanning order to produce a scanned array of coefficient values arranged according to the scanning order, the method comprising the steps of:
    representing the coefficient values in the scanned array by a plurality of number pairs, each of said number pairs having a first number and a second number; and
    assigning the second numbers to one of a plurality of contexts representative of the second numbers such that the second number of a number pair is assigned to a context at least partly in dependence on the first number of the number pair.

11. A method according to claim 10, wherein said plurality of contexts are contexts of a context-based arithmetic coder.

12. A method according to claim 10, wherein said plurality of contexts are contexts of a context-based binary arithmetic coder.

13. A method according to claim 12, further comprising the step of:
    mapping the second numbers of said number pairs to a set of bins, each of which can be assigned one of either a first value or a second value.

14. A method according to claim 13, wherein mapping of a number to a given one of said set of bins is indicated by assigning the bin to the first value.

15. A method according to claim 13, wherein the first value is 1 and the second value is 0.

16. A method according to claim 13, wherein the second number of a number pair is assigned to a context at least partly in dependence on the bin to which the second number of the number pair is mapped.

17. A method according to claim 10, wherein said first number is indicative of a non-zero coefficient value and said second number is indicative of a number of consecutive zero coefficient values preceding said non-zero coefficient value.

18. A system for image coding comprising:
    an input for receiving an image as a plurality of blocks having a plurality of pixels, each pixel having a pixel value;
    a transform coder for performing a transform coding operation on a block of pixels to produce a corresponding block of transform coefficient values;
    a scanner for scanning the block of transform coefficient values in a given scanning order to produce a scanned array of coefficient values, arranged according to the scanning order;
    a run-level coder for representing the coefficient values in the scanned array by a plurality of number pairs, said number pairs having a first number and a second number; and
    a context-based coder for assigning the first numbers to one of a plurality of contexts representative of the first numbers and operative to assign the first number of a first number pair to a context at least partly in dependence on a first number of a second number pair.

19. A system according to claim 18, wherein said context-based coder is a context-based arithmetic coder.

20. A system according to claim 18, wherein said context-based coder is a context-based binary arithmetic coder.

21. A system according to claim 20, wherein the context-based coder is operative to map the first numbers of said number pairs to a set of bins, each of which can be assigned to one of either a first or a second value.

22. A system according to claim 21, wherein the context-based coder is operative to map a number to a given one of said set of bins by assigning the bin to the first value.

23. A system according to claim 21, wherein the first value is 1 and the second value is 0.

24. A system according to claim 21, wherein the context-based coder is operative to assign the first number of a number pair to a context at least partly in dependence on the bin to which the first number of said number pair is mapped.

25. A system according to claim 18, wherein the context-based coder is operative to assign the first number of the first number pair to a context at least partly in dependence on the first number of a preceding number pair in the scanning order.

26. A system according to claim 18, wherein said first number is indicative of a non-zero coefficient value and said second number is indicative of a number of consecutive zero coefficient values preceding said non-zero coefficient value.

27. A system for image coding comprising:
   an input for receiving an image as a plurality of blocks having a plurality of pixels, each pixel having a pixel value;
   a transform coder for performing a transform coding operation on a block of pixels to produce a corresponding block of transform coefficient values;
   a scanner for scanning the block of transform coefficient values in a given scanning order to produce a scanned array of coefficient values arranged according to the scanning order;
   a run-length coder for representing the coefficient values in the scanned array by a plurality of number pairs, said number pairs having a first number and a second number; and
   a context-based coder for assigning the second numbers to one of a plurality of contexts representative of the second numbers, and operative to assign the second number of a number pair to a context at least partly in dependence on the first number of the number pair.

28. A system according to claim 27, wherein said context-based coder is a context-based arithmetic coder.

29. A system according to claim 27, wherein said context-based coder is a context-based binary arithmetic coder.

30. A system according to claim 29, wherein the context-based coder is operative to map the second numbers of said number pairs to a set of bins, each of which can be assigned to one of either a first or a second value.

31. A system according to claim 30, wherein the context-based coder is operative to map a number to a given one of said set of bins by assigning the bin to the first value.

32. A system according to claim 30, wherein the first value is 1 and the second value is 0.

33. A system according to claim 30, wherein the context-based coder is operative to assign the second number of a number pair to a context at least partly in dependence on the bin to which the second number of the number pair is mapped.

34. A system according to claim 27, wherein said first number is indicative of a non-zero coefficient value and said second number is indicative of a number of consecutive zero coefficient values preceding said non-zero coefficient value.

35. A computer program embodied in a computer readable medium comprising:
   machine-readable program code for dividing an image into a plurality of blocks having a plurality of pixels, each pixel having a pixel value;
   machine-readable program code for performing a transform coding operation on a block of pixel values to produce a corresponding block of transform coefficient values;
   machine-readable program code for scanning the block of transform coefficient values in a given scanning order to produce a scanned array of coefficient values arranged according to the scanning order;
   machine-readable program code for representing the coefficient values in the scanned array by a plurality of number pairs, said number pairs having a first number and a second number; and
   machine-readable program code for assigning the first numbers to one of a plurality of contexts representative of the first numbers such that the first number of a first number pair is assigned to a context at least partly in dependence on a first number of second number pair.

36. A computer program embodied in a computer readable medium comprising:
   machine-readable program code for dividing an image into a plurality of blocks having a plurality of pixels, each pixel having a pixel value;
   machine-readable program code for performing a transform coding operation on a block of pixel values to produce a corresponding block of transform coefficient values;
   machine-readable program code for scanning the block of transform coefficient values in a given scanning order to produce a scanned array of coefficient values arranged according to the scanning order;
   machine-readable program code for representing the coefficient values in the scanned array by a plurality of number pairs, said number pairs having a first number and a second number; and
   machine-readable code for assigning the second numbers to one of a plurality of contexts representative of the second numbers such that the second number of a number pair is assigned to a context at least partly in dependence on the first number of the number pair.

37. A method of context-based arithmetic encoding in which an array of data symbols is represented with a code-word, the method comprising:
   representing the data symbols in said array as number pairs comprising a first number and a second number; and
   assigning the first number of a first number pair to a context selected from a plurality of contexts representative of the first numbers at least partly in dependence on a first number of a second number pair.

38. A method of context-based arithmetic encoding in which an array of data symbols is represented with a code-word, the method comprising:
   representing the data symbols in said array as number pairs comprising a first number and a second number;
   assigning the first number of a first number pair to a context selected from a plurality of contexts representative of the second numbers at least partly in dependence on the first number of the number pair.

39. A context-based arithmetic encoder operative to represent an array of data symbols with a code-word and comprising:

a run-level coder for representing the data symbols in said array as number pairs comprising a first number and a second number;

a context assigner for assigning the first number of a first number pair to a context selected from a plurality of contexts representative of the first numbers at least partly in dependence on a first number of a second number pair.

40. A context-based arithmetic encoder operative to represent an array of data symbols with a code-word and comprising:

a run-level coder for representing the data symbols in said array as number pairs comprising a first number and a second number;

a context assigner for assigning the second number of a number pair to a context selected from a plurality of contexts representative of the second numbers at least partly in dependence on the first number of the number pair.

* * * * *

UNITED STATES PATENT AND TRADEMARK OFFICE
CERTIFICATE OF CORRECTION

PATENT NO.    : 6,856,701 B2
DATED         : February 15, 2005
INVENTOR(S)   : Karczewicz et al.

It is certified that error appears in the above-identified patent and that said Letters Patent is hereby corrected as shown below:

Column 30,
Line 61, "first number of a first number pair" should be -- second number of a number pair --.

Signed and Sealed this

Twenty-first Day of June, 2005

JON W. DUDAS
*Director of the United States Patent and Trademark Office*